United States Patent [19]

Fukuchi et al.

[11] Patent Number: 4,825,246
[45] Date of Patent: Apr. 25, 1989

[54] IMAGE PROCESSING METHOD AND IMAGE FORMING APPARATUS

[75] Inventors: Masakazu Fukuchi; Kiyoshi Akazawa, both of Hachioji; Masahiko Matsunawa, Fussa; Hiroshi Niki, Hachioji; Shunji Matsuo, Hino; Hiroyuki Yamamoto, Yokohama; Yoshinori Abe, Hino, all of Japan

[73] Assignee: Konishiroku Photo Industry Co., Ltd., Tokyo, Japan

[21] Appl. No.: 205,548

[22] Filed: Jun. 10, 1988

Related U.S. Application Data

[63] Continuation of Ser. No. 133,160, Dec. 11, 1987, abandoned, which is a continuation of Ser. No. 890,071, Jul. 24, 1986, abandoned.

[30] Foreign Application Priority Data

Jul. 27, 1985 [JP] Japan ................................ 60-166549
Oct. 22, 1985 [JP] Japan ................................ 60-236766

[51] Int. Cl.⁴ .............................................. G03G 15/01
[52] U.S. Cl. .................................... 355/4; 355/14 R; 355/19 C; 118/645; 430/357
[58] Field of Search .............. 355/4, 3 R, 14 R, 14 D, 355/14 E, 14 C; 118/645, 691; 430/357

[56] References Cited

U.S. PATENT DOCUMENTS

| | | | |
|---|---|---|---|
| 4,008,962 | 2/1977 | Nepper | 355/4 X |
| 4,045,219 | 8/1977 | Bean | 355/4 X |
| 4,153,364 | 5/1979 | Suzuki et al. | 355/14 R |
| 4,234,250 | 11/1980 | Mailloux et al. | 355/4 |
| 4,239,374 | 12/1980 | Tatsumi et al. | 355/14 E |
| 4,352,553 | 10/1982 | Hirahara | 355/14 E |
| 4,518,987 | 5/1987 | Saitoh | 358/75 |
| 4,551,750 | 11/1987 | Kurata | 358/75 |

FOREIGN PATENT DOCUMENTS

57-44825 6/1982 Japan.
2102239A 1/1983 United Kingdom.

OTHER PUBLICATIONS

Study with Respect to the Reading and Recording of Two Color Images, Nakano & Nagai, OKI DENKI Kenkyu Kaihatsu, No. 111 vol. 2, Dec. 1980, pp. 43-48.

*Primary Examiner*—A. C. Prescott
*Attorney, Agent, or Firm*—Jordan B. Bierman

[57] ABSTRACT

An image processing method and apparatus wherein document information is separated by using an optical device into two colors that are complementary to each other, converted photo-electrically and processed by using a photo-electric conversion device, and extracted on the basis of the result of processing by using a color extraction information generation device, and a color information designated by the color extraction information of the color extraction information generation device is stored in a color information storage device.

22 Claims, 18 Drawing Sheets

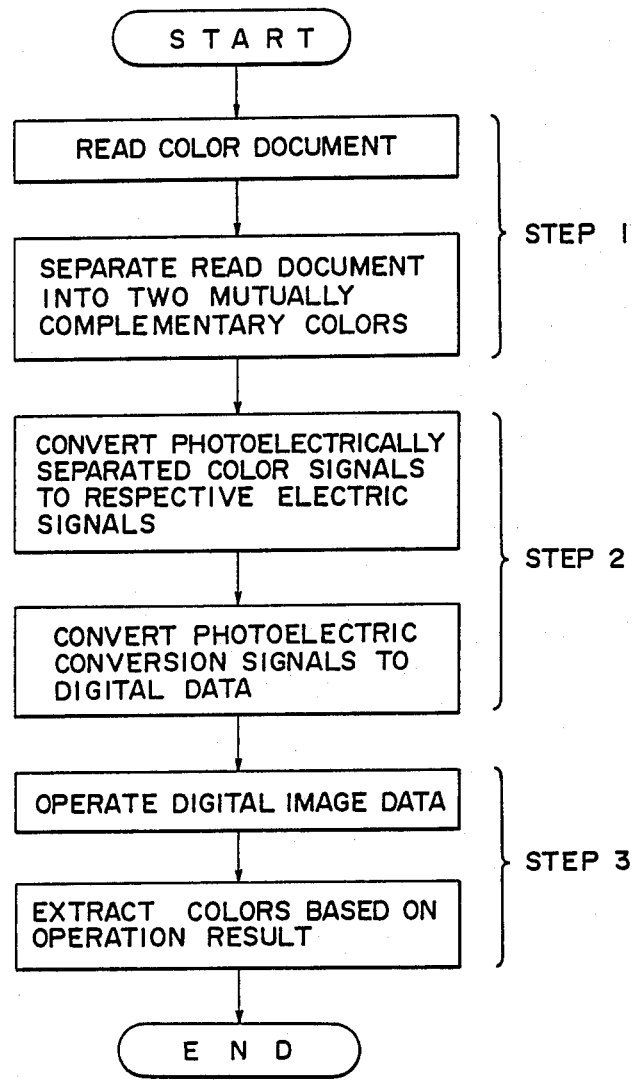

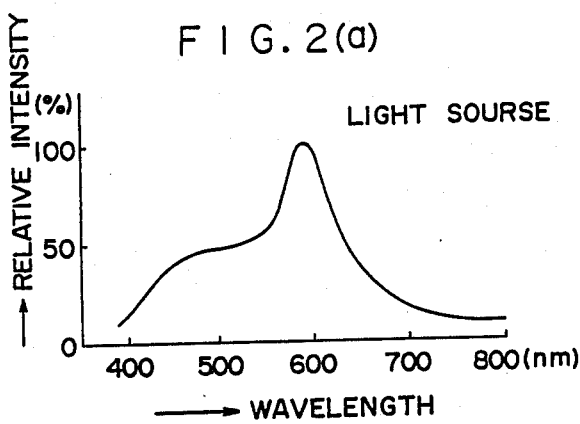
FIG. 2(a) LIGHT SOURSE
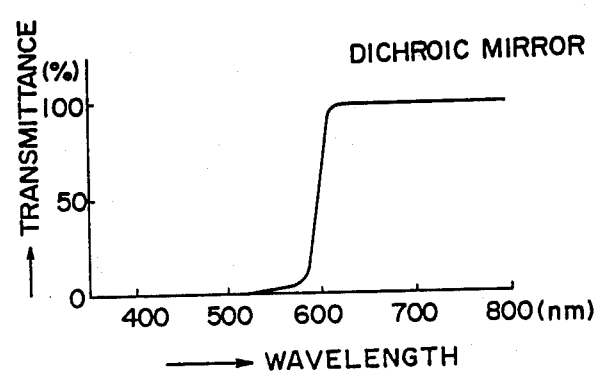
FIG. 2(b) DICHROIC MIRROR
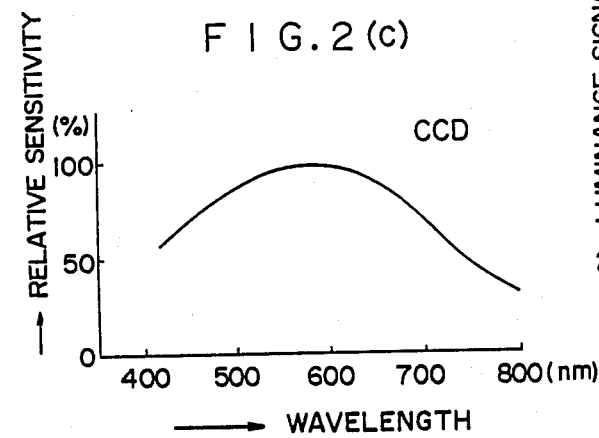
FIG. 2(c) CCD
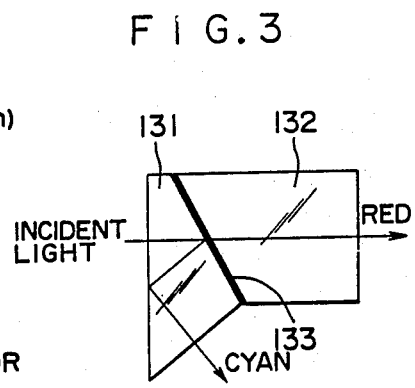
FIG. 3
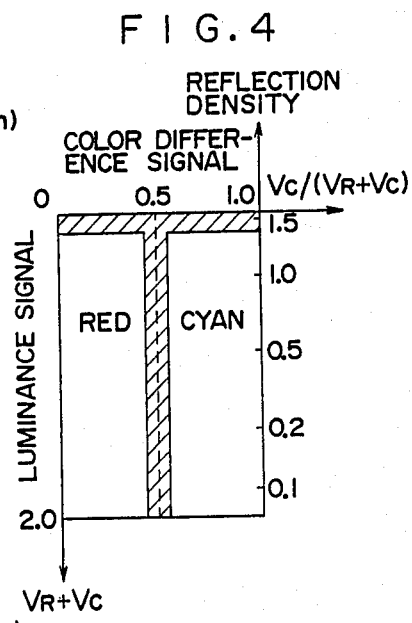
FIG. 4

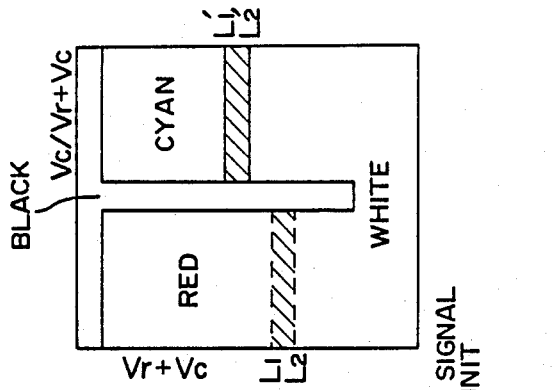
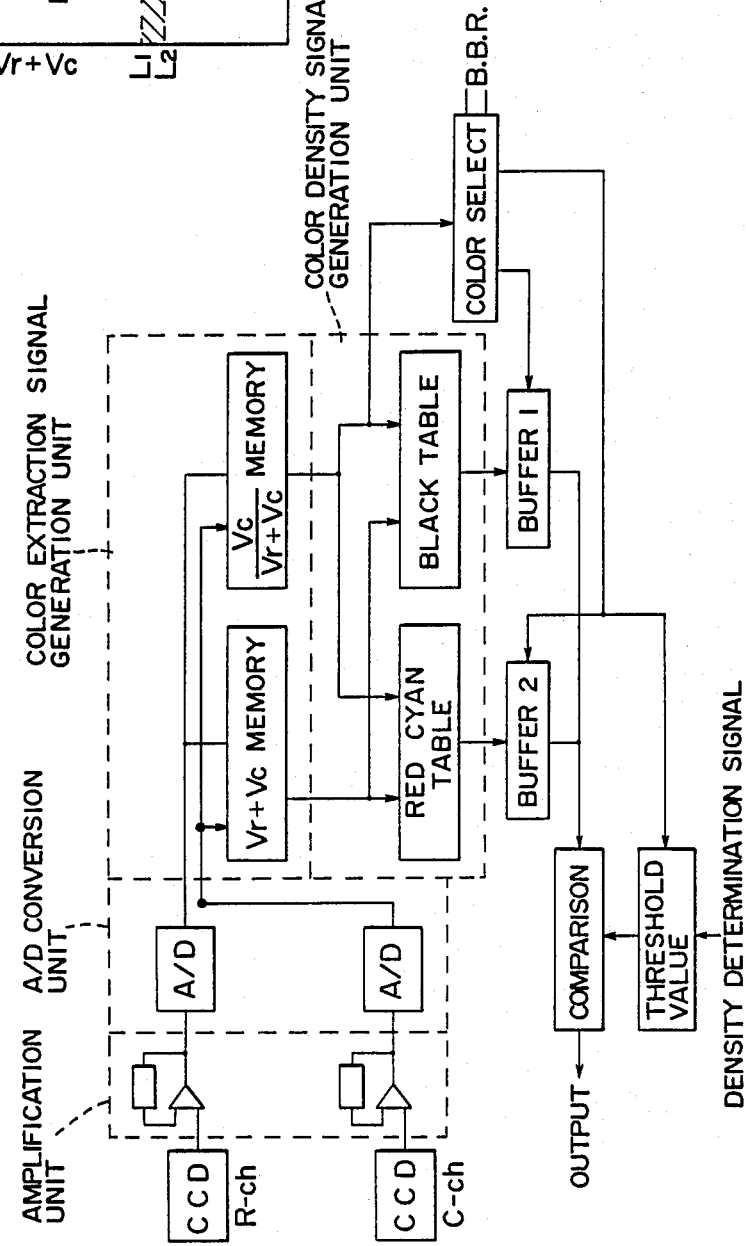
FIG. 21(b)
FIG. 21(a)

IMAGE PROCESSING METHOD AND IMAGE FORMING APPARATUS

This application is a continuation of application Ser. No. 133,160 filed Dec. 11, 1987, abandoned, which is a continuation of application Ser. No. 890,071 filed July 24, 1986, abandoned.

BACKGROUND OF THE INVENTION

1. Field of the Invention

This invention relates to an image processing method by which an output corresponding to color document information can be obtained and an apparatus which forms a color image on an image retainer electrophotographically, such as a color reproducing machine, a color printer, and the like.

2. Description of the Prior Art

Various methods have been known in the past to read a color document with a scanner and to perform color extraction of the color document thus read.

(1) First method:

As depicted in FIG. 8 of the accompanying drawings, a color document 101 is irradiated with red and blue lights emitted from red and blue light sources 102 and 103, respectively, and the respective optical information is received by photoelectric conversion means 104 such as CCD to convert them into electric signals. Then, the outputs of the photoelectric conversion means 104 are normalized to $V_R$ and $V_B$, respectively, by a white paper output value, and these two signals are processed to determine a color extraction map. Preprint No. 1107 of the 1982 general Meeting of the Institute of Electronics and Communication Engineers of Japan suggests that a color extraction map as shown in FIG. 9 of the accompanying drawings can be prepared and a plurality of colors can be extracted on the basis of this map. In FIG. 9, the ordinate represents the normalized output (%) of the photoelectric conversion means 104 when the red light source is turned on and the abscissa does the normalized output (%) when the blue light source is turned on.

(2) Second method:

Two photo-detector parts having mutually different spectral sensitivities are disposed for one pixel, and the outputs $V_A$ and $V_B$ of these parts are processed to extract colors (refer to Japanese Patent Laid-Open No. 44825/1982). For instance, judgement is made in the following manner for a luminance axis in a longitudinal direction $(V_A+V_B)$ white when $V_A+V_B \geq a_1$, chromatic colors when $a_2 < V_A + V_B < a_1$, and black when $V_A + V_B \leq a_2$.

Similarly, judgement is made in the following manner for a hue axis in a transverse direction (log $V_A$ − $V_B$):

red when log $V_A$ − log $V_B \geq b_1$, green when $b_2 <$ log $V_A$ − log $V_B < b_1$, and blue when log $V_A$ − log $V_B \leq b_2$ (where each of $a_1$, $a_2$, $b_1$ and $b_2$ is a constant).

FIG. 10 shows the color extraction map obtained in this manner.

(3) Third method:

This is a method which separates color information into red, green and blue by use of a dichroic mirror and prisms or R, G and B filters (see Japanese Patent Laid-Open No. 62320/1975).

FIG. 11 shows various color separation methods. FIG. 11(a) shows a construction wherein an image 112 of a camera lens 111 is separated into three colors by use of a plurality of relay lenses 113 to 116 and dichroic mirrors 117,117' and the separated images are again formed on camera tubes 118 to 120. FIG. 11(b) shows a construction wherein a plurality of prisms 121 to 124 having specific shapes are disposed between the camera lens 111 and the camera tubes 118 to 120, respectively, while dichroic mirrors 117, 117' are disposed between the prism 121 and the prism 122 and between the prism 123 and the prism 124 respectively, for the color separation into the three colors.

FIG. 11(c) shows a construction wherein three prisms 125,126,126', each having an apex of an acute angle, are fitted in such a manner as to describe a triangle ABC as shown in the drawing, and dichroic mirrors 127,128 are formed on the boundary surface of each prism for the three color separation. FIG. 11(d) shows a construction obtained by exactly turning inside out the construction of FIG. 11(c). Dichroic mirrors 129, 130 are formed on the boundary of each prism.

The first method uses the normalized output of the photoelectric conversion means 104 as such for the axis of the coordinates of the color extraction map coordinates system as shown in FIG. 9. Accordingly, there is no distinction at all between the chromatic colors and achromatic colors and the concept is unclear. Furthermore, there is no concept, either, of the luminance and hue of the document. Since there is no concept of converting the reflection density or reflection rate of the document into the output level, it is difficult to establish correspondence between the document and the output level.

Incidentally, color systems includes a Munsell color system. This system represents three-dimensionally a given color in the coordinates of lightness (value), saturation and hue as shown in FIG. 12. Since the example shown in FIG. 8 does not have the concept of the lightness (value), a given color is viewed on a cross-sectional plane of certain lightness, or in other words, the full lightness is projected on a hue-saturation plane.

The second method does not at all consider a monochromic document. In other words, since this method does not at all have the concept of an achromatic color (grey level), the method is extremely unrealistic when a practical output result is taken into consideration. As to the color document, too, this method is not easy to practise because it does not have the concept of the correspondence between the document and the output value. In other words, this method does not have the concept of converting the reflection density or reflection ratio into the output value level.

The third method has excellent color extraction ability because it is used in the printing field, too, but involves the problem that the construction is complicated as shown in FIG. 11 Therefore, a large number of limitations exist when color separation means having such a construction is incorporated in a reproducing machine, or the like. For instance, since a scanning mirror reciprocates on the color separation means, a large unnecessary space is required so that the size of the apparatus is increased and a regulation mechanism is complicated, too, with an enhanced production cost.

Since color display devices such as color CRT's for computers, videotex terminals, and the like, have become widespread in recent years, the demand for a color hard copy is also increasing. Various business documents are now color-printed, either fully or partially, and the demand for color copies is increasing, too.

Preferably, means for obtaining color hard copies is economical, has a high operation speed and is easy to handle.

Wire dot matrix recording system, ink jet recording system, thermo-sensitive transfer recording system, electrostatic recording system, electrophotographic system, and the like, have been developed to satisfy these requirements.

When various recording systems described above are compared with the electrophotographic system, their merits and demerits are as follows.

(1) Wire dot matrix recording system:

This is a method which prints a character or image consisting of a matrix dots obtained by hitting the back of an ink ribbon by dot wires. This method can reduce the size of the recording apparatus and can be produced economically, but is not free from the problems that the printing speed is low and large noise is generated.

(2) Ink jet recording system:

This system constitutes a character or image by dots obtained by ejecting very small ink droplets Though the recording apparatus for this system can be made relatively compact, it is difficult to produce and necessitates a multi-element nozzle head consisting of a plurality of very expensive elements in the linear form in order to increase its operation speed. Another critical problem of this system is that clogging of the nozzle is unavoidable and hence reliability of the recording apparatus cannot be kept for an extended period. Though a valve jet system has been developed to solve these problems, it is not yet completely satisfactory.

(3) Thermo-sensitive transfer system:

In accordance with this system, a thermal head formed by arranging minute heat generating elements is brought into contact with the rear of an ink film which is fused and transferred to paper upon heating, and electric power is applied to the heat generating elements in order to fuse or sublimate dyes on the ink film and transfer them to a recording medium for recording. Since this method does not use a developing device which deals with powder inside the apparatus, the system is clean and has a simple construction. However, it is not free from various problems. Namely, since the ink film is affected by the quality and condition of the paper to which transfer is made, there is a limit to the kind of paper. Next, the greater the number of colors to be recorded, the greater the number of the ink films, so that running cost will become very high when the ink films cannot be reused. Furthermore, the resulting image looks unnatural because luster is stressed abnormally, and a thermal head capable of high speed operation is very expensive.

In accordance with the three systems described above, it is extremely difficult to obtain resolution of at least 16 dots/mm because there is a limit to the thickness of the dot wires in the case of the wire head matrix system (1) and there is a limit to the sizes of the nozzle and the heat generating elements of the head in accordance with the systems (2) and (3).

In contrast, the apparatus in accordance with the electrophotographic system cannot be made compact so easily because it includes a developing device which deals with a photosensitive member and powder or a liquid, but it has an advantage that high resolution of at least 16 dots/mm can be obtained easily and recording can be made at a high operation speed.

Electrophotographic reproducing machines such as "Xerox 6500" of Xerox, "NP-COLOR, T" of Cannon and "RICOH COLOR 5000" of Ricoh, which are referred to as a "full color processor" and reproduce the colors of the document as such, have the following construction. Namely, the photosensitive member is passed through a green (G) filter, for example, after corona charge to expose the document image, which is developed by a magenta (M) developer, and the resulting magenta visible image is transferred to transfer paper. Next, the photosensitive member is exposed through a blue (B) filter in the same way as above. Development is then made by use of a yellow (Y) developer and the resulting yellow visible image is transferred to the transfer paper in registration with the magenta image that has already been transferred on the transfer paper. Furthermore, the same process is repeated by use of a red (R) filter and a cyan developer, followed by the same procedure described above. The resulting cyan visible image is transferred in registration with the two images described above, and the resulting image is fixed, thereby providing finally a color print.

Thus, in accordance with this method, BGR color separation is applied to the document image, and the photosensitive member is exposed for each color. YMC (and black, if necessary) development is then effected, and the toner image for each color is thereafter transferred one by one in registration with the image of the other colors to the transfer paper on the transfer drum to obtain a full color image.

Color printers of the electrophotographic system for obtaining color hard copies are also known, as described in Japanese Patent Laid-Open No. 144452/1981, for example. In accordance with this prior art reference, an image of each color signal is written on a photosensitive member 301, that is uniformly charged with a charging device 302, with laser $l_1$, $l_2$, $l_3$ as exposure means, as shown in FIG. 29 of the drawings. Symbols $D_1, D_2, D_3$ represent developing devices for respective colors. When the latent images written with the lasers $l_1$, $l_2$, $l_3$ are developed by toners having mutually different colors and are altogether transferred to transfer paper 303 by a transfer electrode 304, a multicolor hard copy can be obtained at a rate of one sheet per rotation of the photosensitive member.

In the prior art example described above, the image is written with three lasers, but the Applicant of the present invention proposed previously a construction wherein the image is written by use of one laser, as disclosed in Japanese Patent Laid-Open Nos. 75850/1985 and 76766/1985. FIG. 30 illustrates the apparatus of Japanese Patent Laid-Open No. 75850/1985 as a representative. One writing means 334 and developing devices 335 to 338 containing yellow, cyan, magenta and black toners, respectively, are disposed around a photosensitive member 331. First of all, the photosensitive member 331 is charged uniformly by a charging device 333, and exposure and write of the image are then effected by use of a laser beam modulated by a yellow image signal. Development is carried out in the developing device 335 containing the yellow toner. After the entire surface of the photosensitive member is charged in the next rotation of the photosensitive member 331, exposure is made by a magenta signal and magenta development is made in the developing device 336. Then, the magenta toner image is formed superposedly on the yellow toner image. After charging of the photosensitive member, exposure by the cyan signal and cyan development are made and the resulting cyan image is then formed superposedly on the two color images. Thereafter, the image is transferred to transfer paper P by a transfer electrode 340 to obtain a color hard copy.

The electrophotographic color recording apparatus described above exposes separately photoelectric signals corresponding to the images that are to be developed in yellow, magenta and cyan, to write the images.

There is also known a method which comprises using additionally a color reader, passing a document image through color filters to expose it on the photosensitive member, and developing the image by developers of colors that are complementary to the color filters used. Besides this method, there is known another method which comprises passing the document image through color filters, projecting the image on photo-conversion elements arranged unidimensionally such as line sensors to pick up electric outputs from the line sensors, modulates laser beams by the signals and records the image of each color in accordance with the electrophotographic system.

This processing system is fundamentally the same as the one used in processing image signals, such as color printing, color scanner, and the like, as color image processing technique in a broad sense of the word. Namely, in order to form an image, three color informations are obtained by color separation into three primary colors (B, G, R), and color reproduction is then made by arbitrary combinations of these color informations.

Besides the method described above for obtaining the color information by color separation into the three primary colors, there are known several other methods, though specific to some extents, by which color is separated into two primary colors to be read and read signals are obtained only for the limited colors.

Examples of such methods include one disclosed in Japanese Patent Laid-Open No. 162755/1981, the one shown in FIG. 10 and disclosed in Japanese Patent Laid-Open No. 44825/1982 and the technique reported by Nippon Telephone and Telegraph Co. in the above-described Preprint of the General Meeting of the Institute of Electronics and Communication Engineers of Japan.

Still another example of the prior art methods is one comprising separating a color into two primary colors with a half mirror and a filter to obtain a color signal on the basis of outputs of a unidimensional photosensor obtained by each of the two separated colors.

The electrophotographic reproducing machine described above is not different from an ordinary monochromic electrophotographic reproducing machine from the viewpoint of the reproduction of each color. Therefore, image density adjustment and fog prevention technique can be applied.

For example, Japanese Patent Publication Nos. 2550/1969, 4337/1974 and 92256/1979 use light as means for somehow compensating for changes in the characteristics of a photosensitive member, Japanese Patent Laid-Open Nos. 36129/1975 and 81237/1975 use corona discharge as the means described above and Japanese Patent Laid-Open Nos. 31942/1973 and 146629/1978 use both of the means. Furthermore, Japanese Patent Laid-Open Nos. 99824/1977, 110046/1977 and 32153/1981 compensate for changes in the characteristics in accordance with the copying time or the number or copies, and Japanese Patent Laid-Open Nos. 87174/1980, 83839/1979 and 98830/1978 control the image density by use of any factors by sensing the factors relating to the image formation process.

When a color reproducing machine based on the electrophotographic system described above is constituted several problems that have not occurred in the monochromic electrophotographic reproducing machine develop and it becomes difficult to obtain a color image always stably with high reproducibility.

For example, the photosensitive member and the developer undergo fatigue or change with time in the course of use of the reproducing machine, and reproducibility of the image tends to get worse. However, if the drop of reproducibility varies from color to color, color reproducibility of a superposed toner image will change when the toner image is superposed with different colors. Color reproducibility will change, too, due to the influences of changes in an exposure quantity and in the charging condition. Stability of the reproducing machines of the systems described above is not good particularly for the full color process. In order to solve these problems, advanced and complicated control is necessary, and the reproducing machine will become great in size and high in the production cost.

In the electrophotographic reproducing machine, a blackish white portion called "base fog" occurs when reproducing a white portion of the document, due to a small amount of toner that attaches to the white portion. This base fog occurs when a residual potential of the photosensitive member becomes great under the condition where the toner must not attach to the photosensitive member. The base fog is ordinarily prevented by applying a bias voltage to neutralize the residual voltage.

The base fog is not much offensive to the eye in the monochromic reproducing machine, but if it occurs in the color reproducing machine, it becomes very offensive because of color mixing and gives a feeling of disagreeableness just like the deposition of serious contamination.

From this aspect, prevention of the occurrence of the base fog is particularly important in the color reproducing machine. Since the occurrence of the base fog varies from color to color, it is extremely difficult to completely prevent it for all colors, and development of effective means has been much desired. Particularly in the case of business documents having colored portions at part of black characters or black-and-white picture, a copy with the base fog or a copy having a low contrast is not desirable, and such problems must be solved by all means.

Among color extraction systems for providing color signals to an image formation apparatus provided with a writing mechanism, as shown in FIGS. 29 and 30, the methods of FIGS. 9 and 10 having a reduced number of colors are more economical but the resulting color print is extremely ugly. Namely, when applying these methods in printing a document composed of a major portion of images having a black-and-white intermediate tone and a minor portion which is colored, the method of FIG. 9 provides a copy in which the intermediate tone portion is colored in violet and which gives an extremely different impression as to the color from that of the original and is quite unnatural. When the method of FIG. 10 is used, the portion of the intermediate tone is colored in green, and the resulting copy is extremely unnatural, too.

The full color process described above has low reproducibility of light colors by writing utensils called "marker pens" that are recently used for underlining documents or for coloring graphs, and the resulting copy has turbid colors of the portions colored by the marker pens or is devoid of the portions of the marker pens themselves.

SUMMARY OF THE INVENTION

It is a first object of the present invention to provide an image processing method and apparatus which reads and extracts a color document into two colors and one achromatic color (black and white) and outputs color signals with a simple construction.

The first invention to accomplish the object described above comprises separating document information into two colors that are complementary to each other, converting photoelectrically the separated color signals, processing the two image signals that are converted photo-electrically, and extracting colors based on the result of processing.

The second invention of this application comprises optical means for obtaining optical signals of two colors that are complementary to each other, photo-electric conversion means for converting the optical signals outputted from the optical means into electric signals, respectively, color extraction information generation means for processing the two image signal outputs from the photo-electric conversion means and extracting colors on the basis of the result of processing, and color information storage means for storing color information designated by the color extraction information generation means.

It is another object of the present invention to provide a compact, light and economical color reproducing machine which can improve stability in color reproduction and can give a clear color hard copy devoid of base fog without deteriorating a feeling of naturalness in making the copy of a document by limiting the kinds of colors to be reproduced.

As a result of intensive studies, the inventors of the present invention have found that the object described above can be accomplished by a color image forming apparatus which comprises means for scanning a document, means for irradiating the document with light and separating the reflected light into at least two optical images having mutually different wavelength components, means for converting the optical images into electric signals, means for converting the electric signals into digital signals, means for extracting colors from the digital signals on the basis of predetermined color information and outputting color signals, means for converting the color signals into optical signals, means for scanning a photosensitive member uniformly charged and writing the optical signals on the photosensitive member, and a plurality of development means for developing the photosensitive member, into which the optical signals are written, by developers. This apparatus repeats writing and development onto the photosensitive member and transfers the image to a member to which the image is to be transferred.

Preferred embodiments of the present invention are as follows.

(1) The color image forming apparatus is equipped with judgement means for making judgement that the output color signal is white in accordance with the quantity of the reflected light of the document, and has such a construction that the white color portion of the document is regarded as a non-image area from the output of the judgement means so that the developers(s) does not adhere to the white color portion.

(2) A plurality of levels are provided for the quantity of the reflected light from the document which is judged as the white color portion.

(3) The judgement means for judging the white color portion are disposed in the same number as that of colors of the developers.

(4) The judgement means for judging the white color portion are disposed separately for chromatic colors and achromatic colors.

(5) A plurality of levels are disposed for the achromatic and chromatic colors.

(6) The judgement means for judging the white color portion are disposed separately for the three primary colors.

These and other objects and novel features of the present invention will become more apparent from the following description when taken in conjunction with the accompanying drawings.

BRIEF DESCRIPTION OF THE DRAWINGS

FIG. 1 is a flowchart showing one example of the method of the present invention;

FIGS. 2(a) 2(c) are diagrams showing the spectral characteristics of a light source, a dichroic mirror and CCD used in the present invention;

FIG. 3 is a structural view of one example of optical means used in the present invention;

FIG. 4 is a diagram showing an example of the color extraction map in accordance with the present invention;

FIGS. 13 through 28 show other embodiments of the present invention, wherein:

FIG. 13 is a schematic structural view of one embodiment of the color image forming apparatus of the present invention;

FIG. 14 is a schematic view of a write portion B in FIG. 13;

FIG. 15 is a sectional view of a developing device in FIG. 13;

FIG. 16 is an explanatory view of the arrangement of a read unit in FIG. 13;

FIG. 17 is a diagram showing the spectral characteristics of a dichroic prism used in the present invention;

FIG. 18 is a block diagram showing the structure of a signal processing unit of the present invention;

FIG. 19 is an explanatory view of the principle of color signal processing in the present invention;

FIGS. 20(a), 20(b) and 20(c) are explanatory views of one example of a color extraction signal generation unit in the present invention;

FIG. 21(a) is a block diagram showing the outline of a signal processing unit of the present invention;

FIG. 21(b) is an explanatory view when a threshold value must be changed in FIG. 21(a);

FIG. 22 is a block diagram showing a modification of the embodiment described above;

FIG. 23 is a block diagram showing another embodiment of the present invention;

FIGS. 24(i a) and 24(b) are explanatory views of still another embodiment of the present invention;

FIG. 25 is a block diagram of an image data processing unit TR of the other embodiment of the present invention;

FIG. 26 is a sectional view of the developing portion in FIG. 24;

FIGS. 27 and 28 are diagrams showing the density characteristics when a field intensity and a frequency are changed, respectively.

DESCRIPTION OF THE PREFERRED EMBODIMENTS

Figure 5:
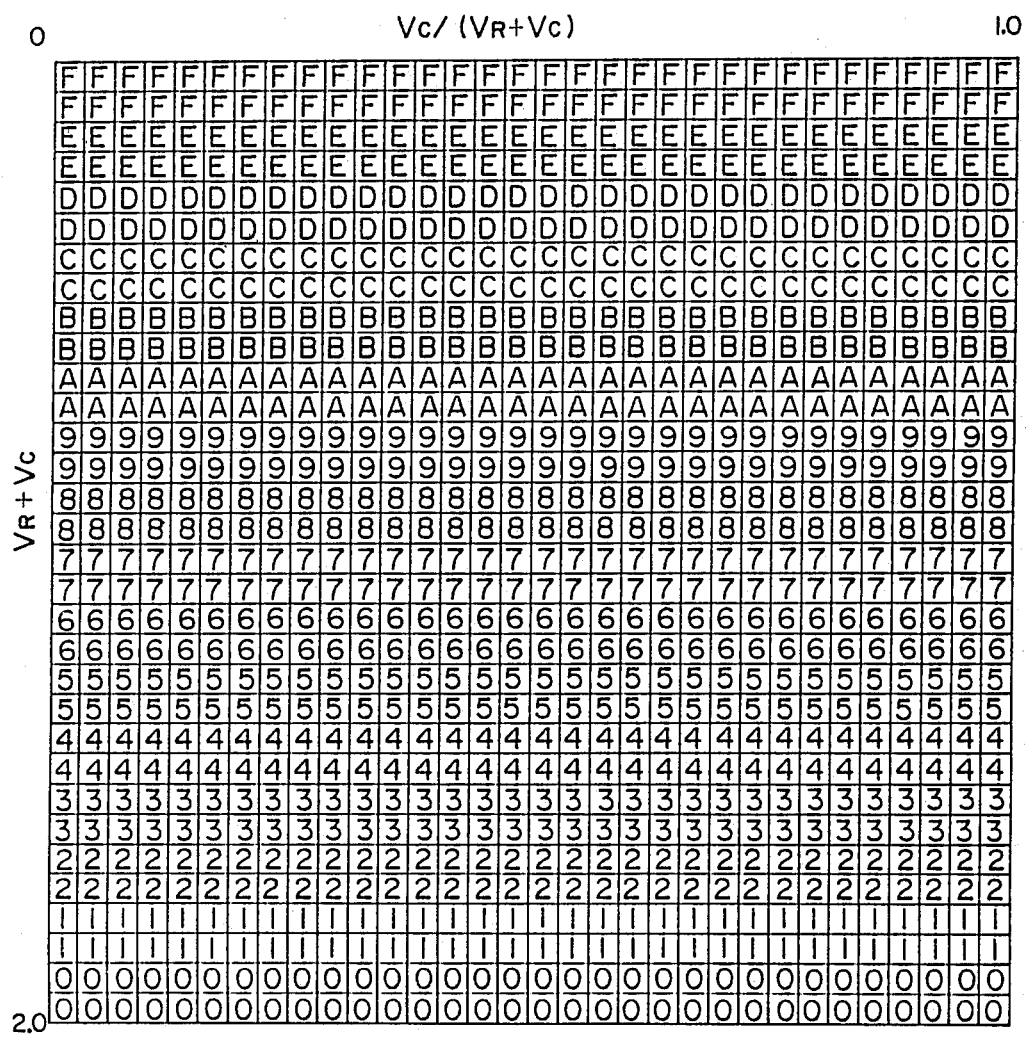
FIG. 5 is a diagram showing an example of a ROM table.

FIG. 1 is a flowchart showing one embodiment of the method of the present invention. Hereinafter, the method of the present invention will be explained with reference to this flowchart.

Step 1

A color document is read. To read the document, the document must be irradiated with light emitted from a light source. A light source having a spectrum as shown in FIG. 2(a) is used, for example. In the diagram, the abscissa represents a wavelength (nm) and the ordinate does a relative intensity (%). The color document is irradiated with the light source having a spectrum as shown in FIG. 2(a). The reflected light from the color document enters optical means as shown in FIG. 3, for example, and is separated into a red component and a cyan component. In this drawing, the reflected light from the color document enters a prism 131. The cyan type color of the incident light is reflected from a dichroic mirror 133 formed on the boundary surface between prisms 131 and 132, and goes out of the prism 131. On the other hand, the red type color transmits through the dichroic mirror 133 and goes out of the prism 132. In other words, the dichroic mirror used in the present invention separates the incident light into two colors that are complementary to each other.

FIG. 2(b) is a diagram showing the characteristics of the dichroic mirror. In the diagram, the abscissa represents a wavelength (nm) and the ordinate does a transmittance (%). It can be understood from the diagram that the red type color having a long wavelength passes through the mirror while the cyan type color having a short wavelength is reflected. Here, the term "complementary relation" means that if the two colors are called "A" and "B", respectively, they have the following relation:

A+B=white

Step 2

The red and cyan colors that have thus been separated are converted into electric signals by use of photoelectric conversion elements such as CCD. FIG. 2(c) shows the spectral sensitivity characteristics of CCD used in the present invention. In the diagram, the abscissa represents a wavelength (nm) and the ordinate does a relative sensitivity (%). As can be seen clearly from the diagram, this CCD exhibits its peak near a wavelength of 600 nm. The photo-electric conversion signals are then normalized by use of an output value of a reference color (white). The red and cyan photo-electric conversion signals thus normalized are hereby called "$V_R$" and "$V_C$", respectively. These photo-electric conversion signals are converted into 6-bit digital data by A/D converters, respectively, in this embodiment, so that the signals can be easily processed by a computer (or a microcomputer).

Step 3

A coordinates system is prepared by use of the digital image data $V_R$ and $V_C$ obtained in Step 2, and color extraction is effected on the basis of the color extraction map thus prepared. The following points are taken into consideration in order to determine the axes of coordinates.

(1) The concept of the reflection ratio (reflection density) of the document corresponding to a luminance signal of television is employed so that an intermediate tone can be reproduced.

(2) The concept of color difference (including hue and saturation) of red, cyan, and the like is employed.

It is advisable to employ the following as the luminance signal data and the color difference signal data, for example.

$$\text{luminance signal data (5 bits)} = V_R + V_C \quad (1)$$

The sum $V_R + V_C$ ($0 \leq V_4 + V_C \leq 2.0$) of $V_R$ and $V_C$ ($0 \leq V_R \leq 1.0$, $0 \leq V_C \leq 1.0$) corresponds to a black level (=0) and a white level (=2.0), and all the colors exist in the range of from 0 to 2.0.

$$\text{color difference signal data (5 bits)} = V_R/(V_R+V_C) \text{ or } V_C/(V_R+V_C) \quad (2)$$

In the case of the achromatic color, the proportion of the $V_R$ and $V_C$ components contained in the sum ($V_R + V_C$) are constant. Therefore, $$V_R/(V_R+V_C) = V_C/(V_R+V_C) = \approx 0.5.$$

In the case of chromatic colors, on the other hand, the value of $V_R/(V_R+V_C)$ or $(V_R+V_C)$ is one of the scales that represents the hue and saturation of the document, as described below.

(1) Red type colors:

$$0.5 < V_R/(V_R+V_C) < 1.0$$

$$0 \leq V_C/(V_R+V_C) < 0.5$$

(2) Cyan type colors $$0 \leq V_R/(V_R+V_C) < 0.5,$$

$$0.5 < V_C/(V_R+V_C) \leq 1.0.$$

Accordingly, the chromatic colors (red and cyan) can be clearly extracted from the achromatic color by use of the coordinates system having $V_R+V_C$ and $V_R/(V_R+V_C)$ or $V$ ($V_R+V_C$) as the two axes.

FIG. 4 shows one example of the color extraction map which divides color zones in accordance with the color extraction method described above. In the drawing, the abscissa represents the color difference signal data $V_C/(V_R+V_C)$, the left ordinate represents the luminance signal data $V_R+V_C$ and the right ordinate represents the reflection density by the achromatic color. The achromatic color exists near the color difference signal data=0.5 and in the range where the luminance signal data are small, and the range below 0.5 is for the red type colors while the range above 0.5 is for the cyan type colors. Since the correspondence shown in the drawing exists between the reflection density and the luminance signal data $V_R+V_C$, it is likely to be directly associated with an output value. Though $V_C/(V_R+V_C)$ is plotted as the color difference data on the abscissa, the same effect will be obtained when $V_R/(V_R+V_C)$ is used.

In a practical image processing apparatus, the color extraction map shown in FIG. 4 is prepared and stored in a ROM table. FIG. 5 shows one example of such ROM tables, and the table shown has a 32×32 dot capacity. As the address bit number, therefore, row addresses ($V_R+V_C$) are 5 bits and column addresses ($V_C/(V_R+V_C)$) are 5 bits. This table stores the quantitized density correspondence values (pattern) obtained from the reflection density of the document.

At the time of output, the density data are read out of the corresponding regions by using the luminance signal $V_R+V_C$ and the color difference signal $V_C/(V_R+V_C)$ as the addresses, and are selected for each color in accordance with a color select signal. The density data thus read out is then binary-coded with a threshold value which is designated for each color zone, and the obtained value is used as the output data. The output data need not always be binary-coded values but may be multiply coded values.

Figure 6:
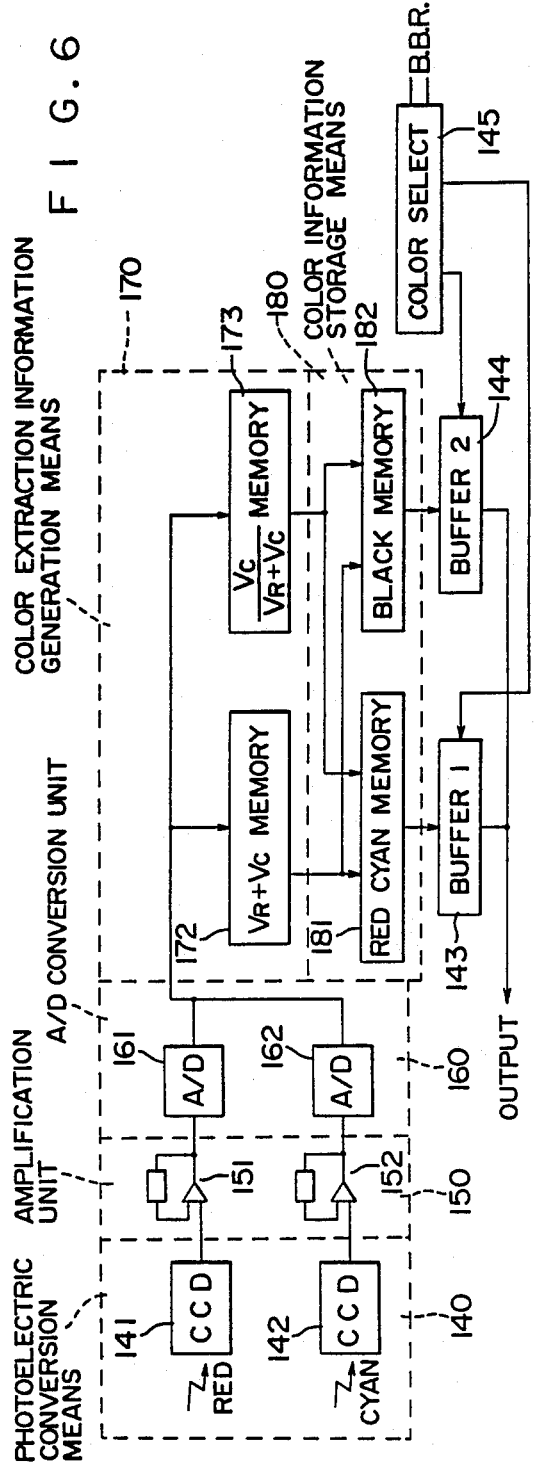
FIG. 6 is a structural block diagram showing one embodiment of the apparatus of the present invention.

FIG. 6 is a structural block diagram showing one embodiment of the apparatus of the present invention. In the drawing, reference numeral 141 represents a first CCD for receiving the red type optical data; 142 is a second CCD for receiving the cyan type optical data; 151 is a first amplifier for amplifying the photo-electric conversion output of the first CCD 141; and 152 is a second amplifier for amplifying the photoelectric conversion output of the second CCD 142. The first and second CCD's 141 and 142 constitute photo-electric conversion means 140, while the first and second amplifiers 151 and 152 constitutes an amplifier unit 150.

Reference numeral 161 represents a first A/D converter for converting the output of the first linear amplifier 151 to equidistant digital data, and 162 is a second A/D converter for converting likewise the output of the second linear amplifier 152. These first and second A/D converters 161 and 162 constitute an A/D converter unit 160. As the bit number of these A/D converters, 6 bits or the like are used, for example.

Reference numeral 172 represents a first memory which receives input signals $V_C$ and $V_R$ and generate a value of $V_C+V_R$ as an output; 173 is a second memory which receives input signals $V_C$ and $V_R$ and generates a value of $V_C/(V_R+V_C)$ as an output; 181 is a third memory for receiving the outputs of the first an second memories 172, 173 as the addresses and outputting the chromatic colors (red, cyan) data; and 182 is a fourth memory for receiving the outputs of the first and second memories 172, 173 as the addresses and outputting achromatic color (black, grey, white) data. An operation circuit and the first and second memories 172, 173 constitute color extraction information generation means 170, while the third and fourth memories 181, 182 constitute color information storage means 180. A microcomputer, for example, is employed as the operation circuit. When the third and fourth memories 181, 182 are combined, there is obtained the ROM table shown in FIG. 5.

Reference numeral 143 represents a first buffer for storing temporarily the output of the third memory 181, and reference numeral 144 does a second buffer for storing temporarily the output of the fourth memory 182. Reference numeral 145 represents a color select circuit for receiving B (black) B (blue) R (red) select signals, and the output of this circuit is applied to the first and second buffers 143, 144. Any one of the outputs of these first and second buffers 143, 144 is the output of the apparatus shown in the drawing. The figures in the drawing represent the bit numbers of signal lines. The operation of the apparatus having the construction described above is as follows.

The optical data of the color document enters the optical means shown in FIG. 3 and is separated into the red type and the cyan type. The optical data of the red and cyan types thus separated then enters CCD's 141, 142 to be converted into electric signals, respectively. The resulting image signals are applied to the amplifiers 151, 152, respectively, to be amplified to predetermined levels and then converted into digital data by the A/D converters 161, 162.

The operation circuit receives the red and cyan type image data that are converted into the digital data as described above, and normalizes them by the output value of a reference color (white). In other words, the red and cyan type image data are normalized by the image data of the reference color which is here supposed to be 1.0. The image data normalized in this manner are here called "$V_R$" and "$V_C$", respectively.

Next, the operation circuit performs operations expressed by the afore-mentioned formulas (1) and (2) and the results of operations are stored in the first and second memories 172 and 173. Namely, the luminance signal $V_R+V_C$ is stored in the first memory 172 while the color difference signal $V_C/(V_R+V_C)$ is stored in the second memory 173. The outputs of these first and second memories 172, 173 are applied to the third and fourth memories 181, 182 as the address signals. The third and fourth memories 181, 182 output the density correspondence data stored at the addresses corresponding to the input addresses, and these data are held by the buffers 143, 144, respectively.

On the other hand, the color select circuit 145 receives the B.B.R. signal and applies the select signal to either one of the first and second buffers 143, 144. When, for example, the first buffer 143 is selected, the red or cyan density correspondence data is outputted and when the second buffer 144 is selected, the black type (white, grey, black) density correspondence data is outputted. The density correspondence data thus outputted is converted into binary-coded data (or multiply coded data at times) by use of the threshold value set for each color zone by a binary coding circuit not shown in the drawing. When the binary-coded data is applied as the input data to a printer, a reproducing machine or the like, the data can be outputted and displayed to the outside.

Incidentally, recording means of the output value include exposure to the surface of a photosensitive member by optical fiber (OFT), liquid crystal display (LCD), laser, and the like, ink jet, thermal transfer, recording on a silver salt or a non-silver material, and CRT. The operations described above are repeated whenever CCD's 141, 142 receive the optical data.

Figure 7:
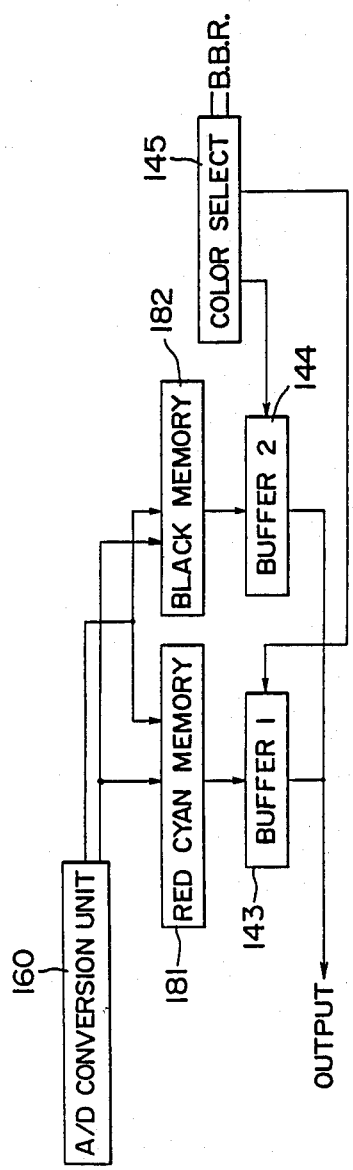
FIG. 7 is a structural block diagram showing another embodiment of the present invention.

In the embodiment shown in FIG. 6, the color separation information generation means 170 and the color information storage means 180 are disposed separately by way of example, but they can be formed integrally with one another. FIG. 7 is a structural block diagram showing another embodiment of the apparatus of the present invention, wherein the color separation information generation means and the color information storage means are formed integrally. Like reference numerals are used to identify like constituents as in FIG. 6.

The digital image data from the A/D conversion unit 160 are applied to the operation circuit. This circuit processes $V_R$ and $V_C$ and determines the luminance signal $V_R+V_C$ and the color difference signal $V_C/(V_R+V_C)$. These values are stored in the memories 181 and 182 as ready address data. The subsequent operations are the same as those of FIG. 6 and are hence omitted.

In the description given above, $V_C/(V_R+V_C)$ is plotted on the abscissa of the color extraction map shown in FIG. 4, but $V_R/(V_R+V_C)$ may be plotted. The same effect of the abscissa can be obtained likewise by using $(V_R-V_C)/(V_R+V_C)$ or $(V_C-V_R)/(V_R+V_C)$ as the abscissa. When $(V_R-V_C)/(V_R+V_C)$ is used for the abscissa, for example, the following relations hold:

achromatic color near $(V_R-V_C)/(V_R+V_C)=0$, red type when $(V_R-V_C)/(V_R+V_C)>0$, and cyan type when $(V_R-V_C)/(V_R+V_C)<0$.

In the description given above, the dichroic mirror has the spectral characteristics of red transmission and cyan reflection, but the present invention is not particulary limited thereto. Namely, any dichroic mirrors can be used so long as they have such spectral characteristics that they separate a color into two colors having the complementary relation, such as green and magenta, blue and yellow, and other combinations. Similarly, the color separation means is not particularly limited to the dichroic mirror and any means capable of separating a color may be used. For instance, it may be a spectral filter. The color extraction map need not be of a T-shaped type as shown in FIG. 4 and various other maps may also be used.

In the description given above, the operation circuit processes $V_R+V_C$ AND $V_C/(V_R+V_C)$ and performs normalization of the outputs of the A/D converters 161, 162. However, the present invention is not particularly limited thereto, and the memories 172, 173 may be directly addressed by the outputs of the A/D converters 161, 162. In such a case, it is advisable to use those ROM's as the memories 172, 173 into which data having the $V_R+V_C$) and $V_C/(V_R+V_C)$ characteristics corresponding to the input addresses $V_R$, $V_C$ are written, respectively. In this case, too, the operation circuit may be eliminated if full scale adjustment is made in advance in the A/D converters 161, 162 so that the full scale (FS) data of 1, 0 are outputted when the image data of the white reference color are inputted.

Fluorescent markers as the writing utensils generally have such conditions that ordinary analog reproducing machines cannot reproduce the colors. However, since the ranges where the red and cyan type markers are positioned are known inside the coordinates system of the present invention, it is possible to erase the colors of the markers or to output them, on the contrary.

As described above in detail, the present invention separates a color of a color document into two kinds of colors that are complementary to each other, then processes the two image signals to generate a luminance signal and a color difference signal and prepares a color extraction map using these signals as the coordinates axes in order to extract and output a given color into the chromatic colors and the achromatic color (black and white).

Figure 13:
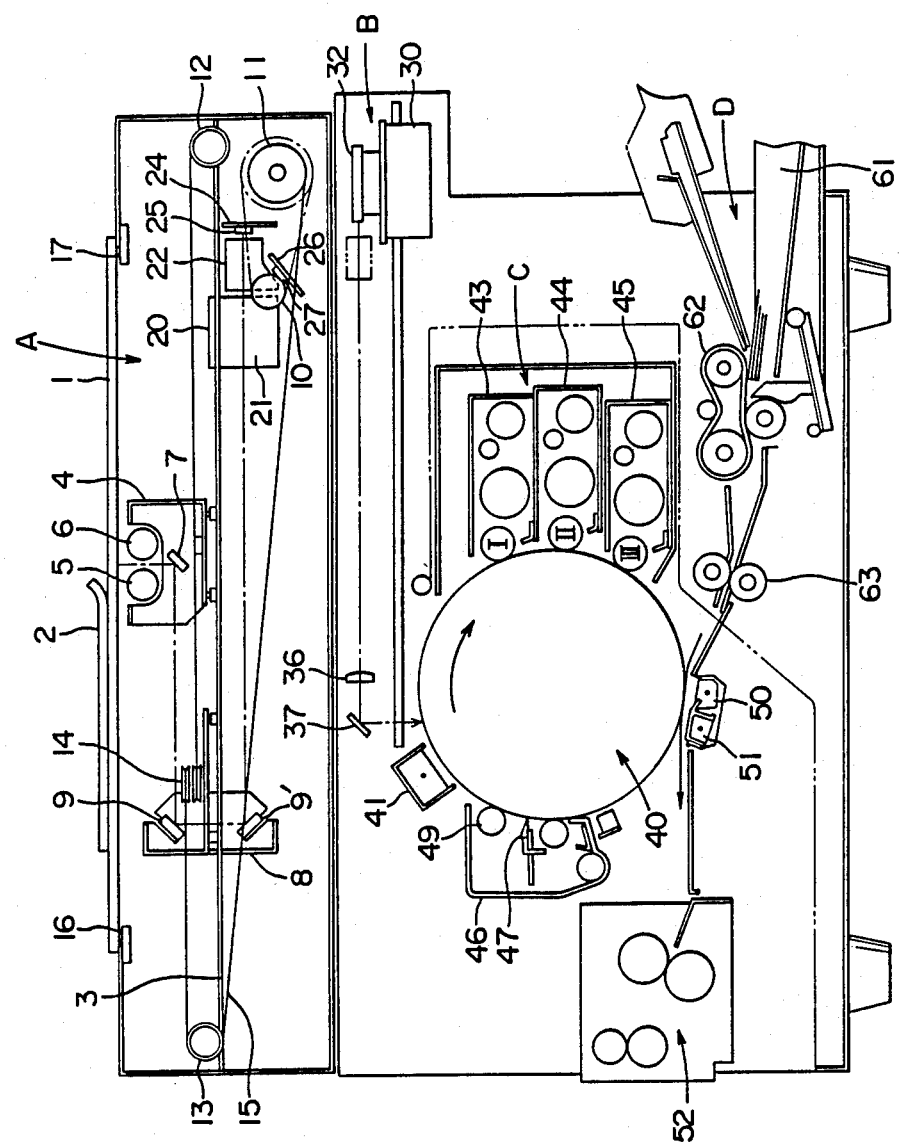

FIG. 13 shows a construction of an image formation device in accordance with the present invention, which forms a color image in the following manner.

Figure 14:
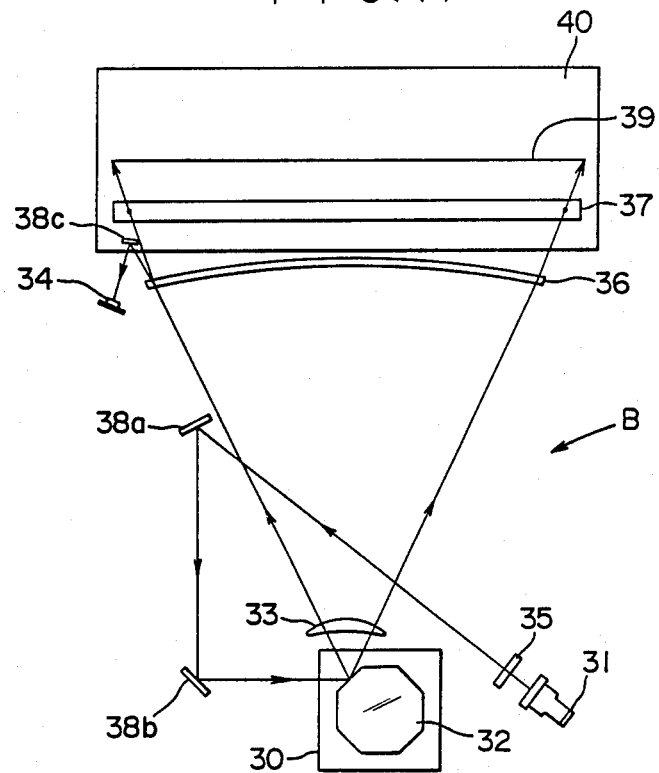
Figure 15:
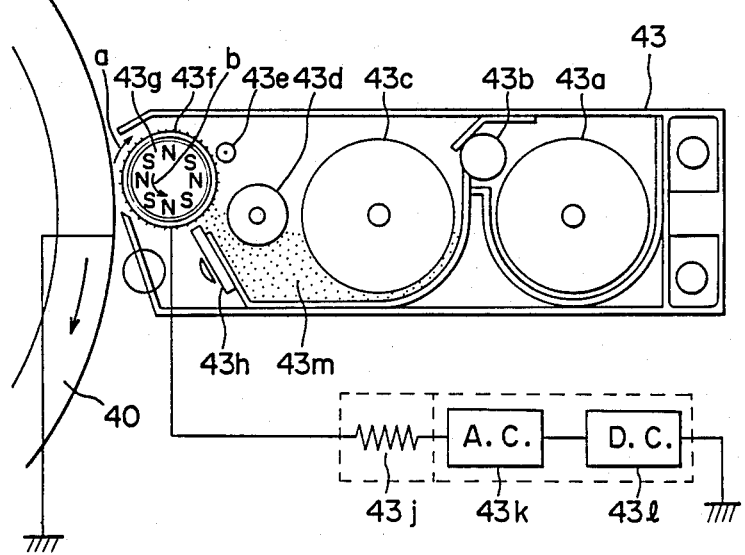

In FIG. 13, symbol A represents a read unit; B is a write unit; C is an image formation unit; and D is a paper feed unit. FIG. 14 is a plan view of the disposition on plane of the internal constituent elements of the write unit B, and FIG. 15 is a sectional view of the construction of a developing device used in the apparatus of the present invention.

In the read unit A, reference numeral 1 represents platen glass, on which a document 2 is placed. The document 2 is irradiated with fluorescent lamps 5 and 6 that are disposed on a carriage 4 moving on a slide rail 3. Mirrors 9 and 9' are mounted on a movable mirror unit 8 and move on the slide rail 3 to guide the optical image of the document 2 on the platen glass 1 by the combination with the first mirror 7 disposed on the carriage 4 to the read unit 20.

The carriage 4 and the movable mirror unit 8 are driven at speeds of V and ½V in the same direction, respectively, by pullies 11, 12, 13, 14 that are driven by a stepping motor 10 through a wire 15. Reference white color plates 16, 17 are disposed at both end portions on the reverse of the platen glass 1 in order to obtain the reference white color signals before the start and after the completion of document scanning.

The lens read unit 20 consists of a lens 21, a prism 22, a first read substrate 24, a red channel (hereinafter called "R-ch") CCD 25, a second read substrate 26 and a cyan channel (hereinafter called "C-ch") CCD 27. The optical image of the document transmitted by the first mirror 7, the mirror 9 and the mirror 9' is converged by the lens 21, and is separated into R-ch and C-ch images by a dichroic mirror 23 disposed inside the prism 22 and their images are formed on the light reception surfaces of the R-ch and C-ch CCD's 25 and 27 that are disposed on the first and second read substrates 24 and 26, respectively.

Warm white fluorescent lamps that are available commercially are used as the fluorescent lamps 5 and 6 in order to prevent the stress and attenuation of specific color(s) of light source when the document is read. These lamps are lit by a high frequency power source of 40 kHz in order to prevent flicker and are heated by heaters using a posistor to keep their wall temperature at a constant level or to promote their warm-up.

The image signals outputted from R-ch and C-ch CCD's 25, 27 are processed in a signal processing unit E which will be described below. In the signal processing unit E, color signals extracted in accordance with the colors of toners which will be described below are outputted and inputted into the write unit B.

The write unit B has a construction as shown in FIG. 2. A laser beam generated by a semiconductor laser 31 is rotatingly scanned by a polygonal mirror 32 which is rotated by a driving motor 30 and is projected on the surface of a photosensitive drum 40 to form a bright line 39 after its optical path is bent by a reflecting mirror 37 through an F$\theta$ lens Reference numeral 34 represents an index sensor for detecting the start of beam scanning and reference numerals 35 and 36 represent cylindrical lenses for correcting inverted angles. Reference numerals 38a, 38b, 38c represent reflecting mirrors which form beam scanning optical path and beam detection optical path.

When scanning is started, the start is sensed by the index sensor 34 and modulation of the beam by the first color signal. After being modulated, the beam scans the photosensitive drum 40 that is uniformly charged in advance by a charger 41. A latent image corresponding to the first color is formed gradually by the main scanning with the laser beam and the subscanning by the rotation of the photosensitive drum 40. This latent image is developed by a developing device 43 into which a red toner is charged, for example, thereby forming a toner image on the drum surface. The resulting toner image passes below a cleaner 46 spaced apart from the surface of the photosensitive drum while the toner image is being retained on the drum surface, and then enters a next copy cycle. The photosensitive drum 40 is charged again by the charger 41.

Next, the second color signal outputted from the signal processing unit E is inputted to the write unit B and the writing to the drum surface is made in the same way as in the case of the first color signal to form a latent image. The latent image is developed by a developing device 44 into which a blue toner, for example, is loaded. This blue toner image is formed in registration with the red toner image that has already been formed.

Reference numeral 45 represents a developing device having a black toner, and this developing device 45 forms a black toner image on the drum surface on the basis of a control signal generated from the signal processing unit. A.C. and D.C. biases are applied to the sleeves of these developing devices 43, 44, 45 so that jumping development by the two-component toner is effected and development is made in a non-contact system on the photosensitive drum 40 which is grounded.

Next, the developing device 34 will be described in detail with reference to FIG. 15. Reference numeral 43a represents a tonner supplier; 43b is a sponge roller; 43c and 43d are toner stirrers; 43e is a scraper; 43f is a developing sleeve; 43g is a magnet; 43h is an h-cut plate; 43j is a resistor; 43k is an A.C. power source; and 43l is a D.C. power source.

The toner supplied from the toner supplier 43a is sent into the developing unit consisting of the developing sleeve 43f and the developing magnet 43g by the action of the sponge roller 43b and the stirrers 43c, 43d. A layer of a developer 43m consisting of a toner and a carrier, whose thickness is controlled to a constant level by the cut plate 43h, is formed on the developing sleeve 43f, and develops the latent image formed on the surface of the photosensitive drum 40. Reference numeral 43e represents a scraper for scraping off the developer from the surface of the sleeve 43f after development. Arrow a represents the moving direction of the developer and arrow b does the rotating direction of the magnet roller. The A.C. power source 43k and the D.C. power source 43l are connected to the developing sleeve 43f through the reresistor 43j, and a developing bias is applied across the sleeve 43f and the photosensitive drum 40. The material of the photosensitive member, the bias voltage and other image formation conditions will be described in detail elsewhere.

The superposed image of the toner image by the first color signal, the toner image by the second color signal and the black toner developed by the developed black toner is transferred to recording paper 61 sent from a paper feed belt 62 and a paper feed roller 63 of the paper feed unit, from a transfer electrode 50. The transfer paper to which the toner image is thus transferred is separated from the photosensitive member by a separation electrode 51 and is sent to, and fixed by, a fixing device 52, where a color hard copy can be obtained.

After the transfer is completed, the cleaning device 46 comes into contact with the photosensitive drum 40 to clean and remove the unnecessary toner from the drum surface by means of its blade 47. A roller 49 of the cleaning device is disposed in order to remove a small amount of toner that is left between the drum surface and the blade when the blade 47 leaves the drum surface to prepare the next exposure and development after cleaning. It rotates in a direction opposite to that of the drum, comes into sliding contact with the contact portion of the drum surface and recovers any residual toner.

Next, the processing unit for processing the signal that has been read will be described with reference to FIGS. 16 to 20.

Figure 16:
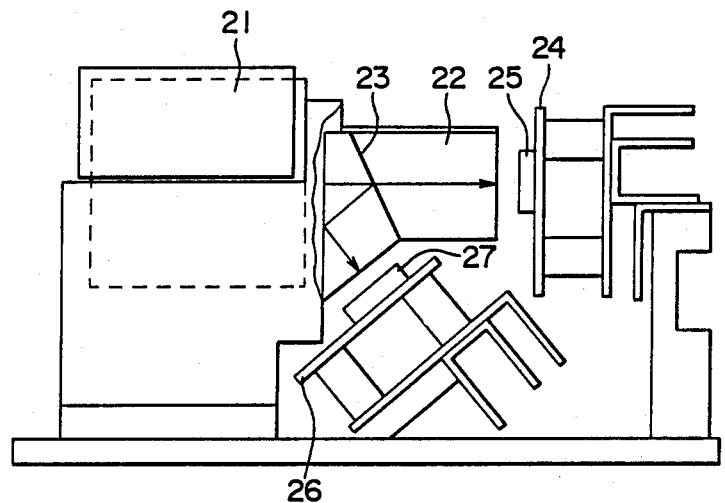

FIG. 16 is a partial sectional view of the details of the read unit A shown in FIG. 13. The image of the document entering the lens 21 is separated into the red color and the cyan color by the dichroic mirror surface 23 of the dichroic prism 22 and then enter the R-ch CCD 25 and C-ch CCD 27 on the first and second read substrates 24 and 26, respectively.

Figure 17:
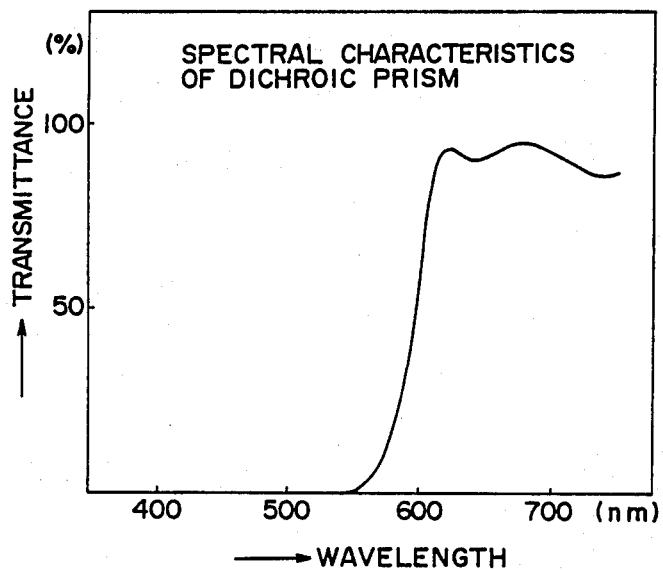

Here, the spectral reflection characteristics of the dichroic prism used for the color separation are shown in FIG. 17. In the diagram, the ordinate represents the transmittance (%) and the abscissa does a wavelength (nm). The red component utilizes transmission while the cyan component does reflection. The diagram shows an example where a transmittance is about 50% near a wavelength of 600 nm.

The principle of generating the color signal from the color extraction information signal in the present invention will now be described with reference to FIGS. 18 to 20.

The reflected optical image of the document 2 which is separated into the red and cyan components by the dichroic prism 22 enter the R-ch and C-ch CCD's 25 and 27, and are converted into electric signals. The electric signals outputted from both CCD's are amplified by the amplifiers Amp-R and Amp-C and converted into digital signals by A/D converters A/D-r and A/D-c. The digital signals are then normalized by the output value of the reference color (white) and are picked up as the red and cyan component output signals Vr and Vc, respectively.

In the next color extraction signal generation unit, the sum signal (Vr+Vc) and the color range designation signal Vc/(Vr+Vc) obtained by dividing the cyan component Vc by the sum (Vr+Vc) are generated, and these signals are temporarily stored. The sum signal and the color range designation signal are generated in the signals corresponding to the color and the density, in the color density signal generation unit using read-only memories (hereinafter called "ROM").

Figure 19:
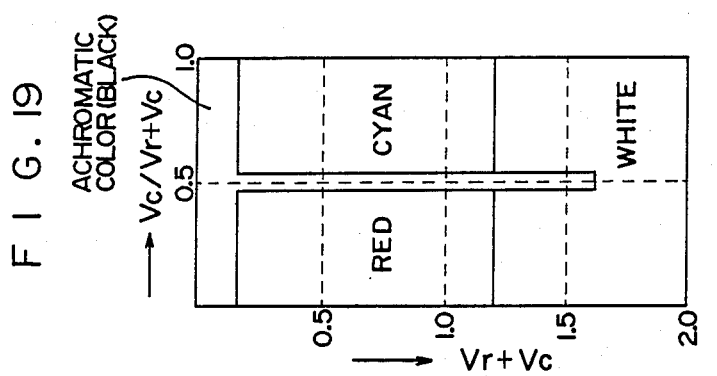
Figure 20:
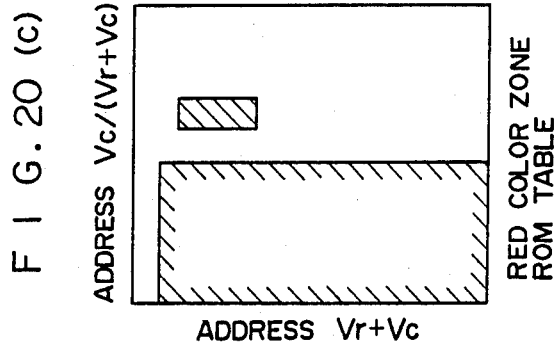
Figure 20:
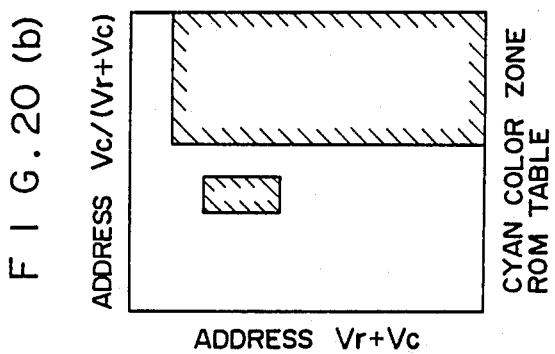
Figure 20:
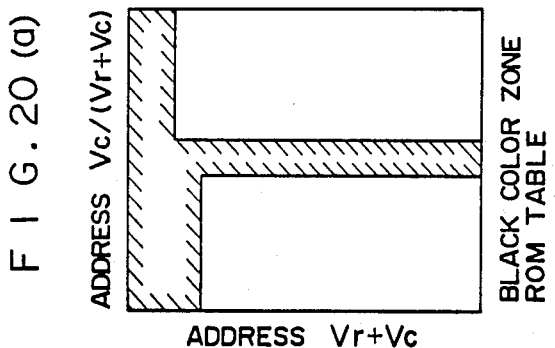

The relation between the color difference signal and the luminance signal in the present invention is shown in FIG. 19. The sum (Vr+Vc) as the luminance signal information is plotted on the ordinate while Vc/(Vr+Vc) as the color difference signal, on the abscissa, to obtain the axes of the coordinates. In this manner, the corresponding positions of the input signals can be determined from the color and the density. The luminance information signal and the color difference signal information have the following properties.

Luminance information signal (Vr+Vc):

This is the sum of Vr and Vc ($0 \leq Vr, Vc \leq 1.0$). The black level corresponds to 0 and the while paper level does to 2.0, with all the colors existing in the range of from 0 to 2.0.

Color difference signal information (Vr/(Vr+Vc), Vc/ Vr+Vc)):

If the color is achromatic, the Vr and Vc components included in the sum (Vr+Vc) are constant. That is, $$Vr/(Vr+Vc) \approx Vc/(Vr+Vc) \approx 0.5.$$

If the color is a chromatic color, Vr/(Vr+Vc) or Vc/(Vr+Vc) is greater or smaller than 0.5, and this variance is one of the scales representing the hue and saturation of the document. Namely, red type color:

$$0.5 < Vr/(Vr+Vc) \leq 1.0, \ 0 \leq Vc/(Vr+Vc) < 0.5,$$

cyan type color:

$$0 < Vr/(V+Vc) < 0.5, \ 0.5 < Vc/(Vr+Vc) \leq 1.0.$$

When the relation described above is expressed in terms of the coordinates system as shown in FIG. 19, the achromatic color and the chromatic colors (red type and cyan type) can be extracted accurately.

The diagram shows an example where the color zoning is effected in accordance with the color extraction method described above.

achromatic color near $Vc/(Vr+Vc)=0.5$, red type color when $Vc/(Vr+Vc)<0.5$, and cyan type color when $Vc/(Vr+Vc)>0.5$.

Since (Vr+Vc) of the ordinate corresponds to the reflection density, it can be made to correspond to the output value.

Figure 8:
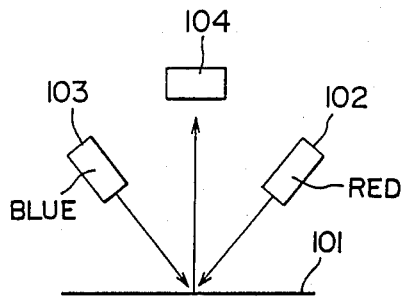
FIG. 8 is a schematic view of the concept of a color separation optical system.
Figure 9:
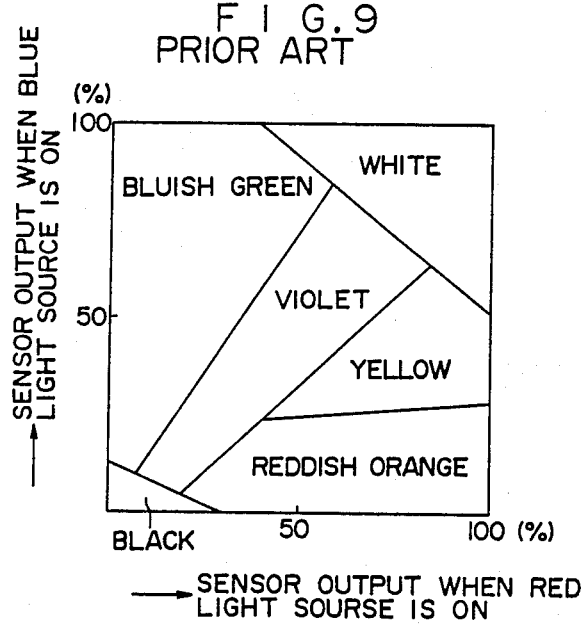
FIGS. 9 and 10 are diagrams showing examples of conventional color extraction maps.
Figure 10:
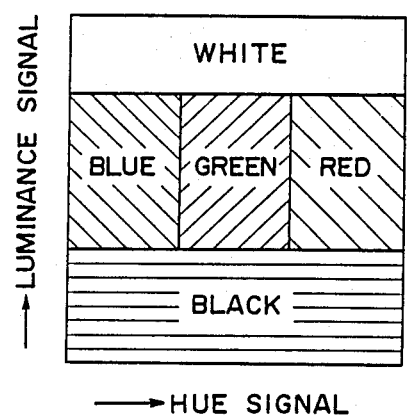
Figure 11A:
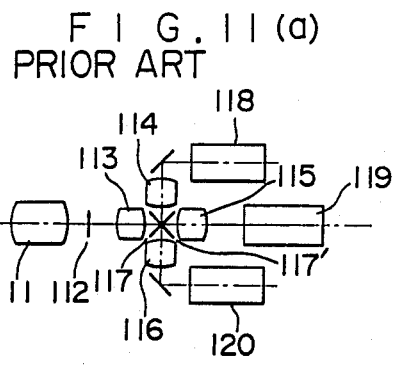
FIGS. 11(a) to 11(d) are structural views of the conventional color separation optical system.
Figure 11C:
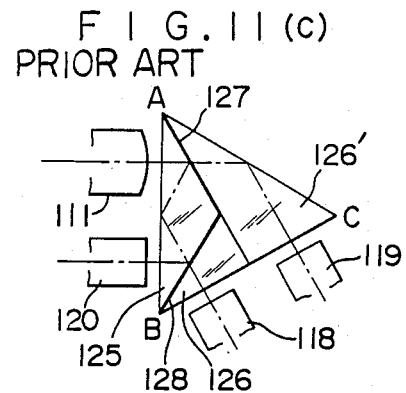
Figure 11B:
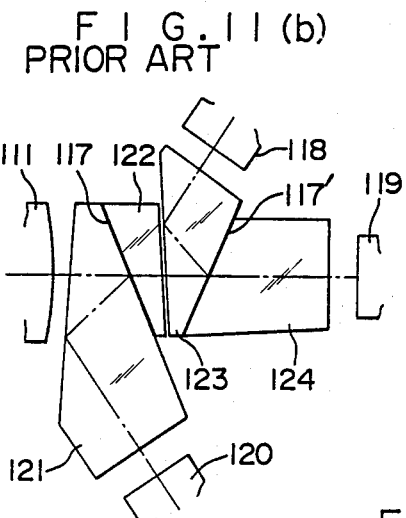
Figure 11D:
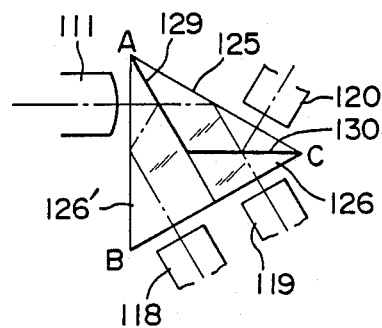
Figure 12:
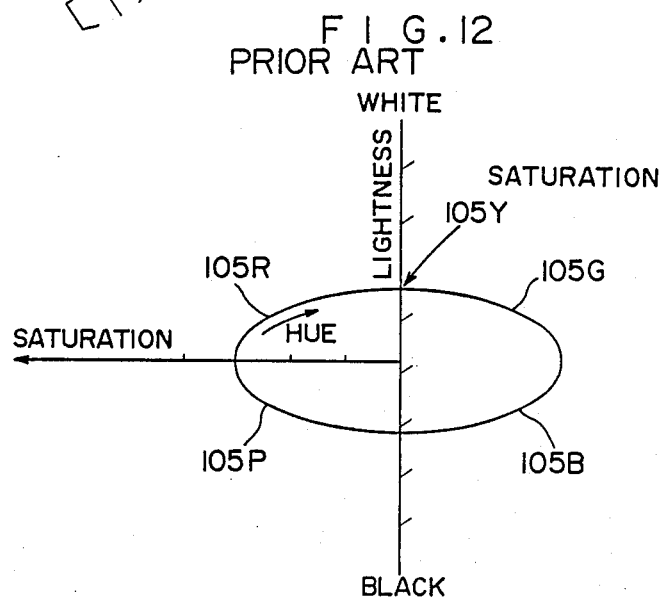
FIG. 12 is a diagram showing the Munsell color system.

In the color difference signal-luminance signal generation apparatus, to generate the color, density signal, the addresses are designated by Vr+Vc and Vc/(Vr+Vc) by utilizing ROM, and the outputs corresponding to their combinations are generated. FIG. 8 shows a ROM table in order to obtain the digital values of 0 or 1 for the density signal output in the manner achromatic color and the chromatic colors (red type colors and cyan type colors).

Figure 18:
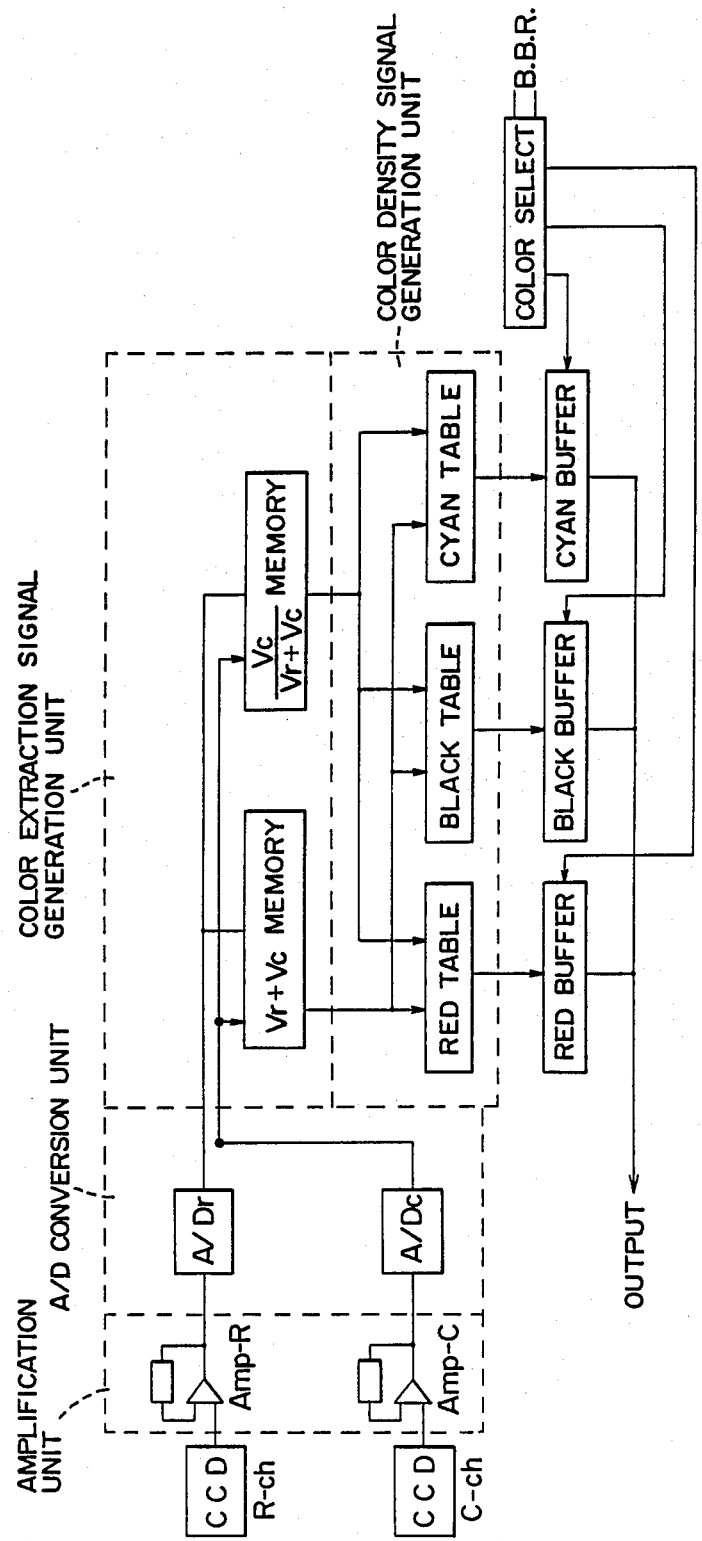

Red, cyan and black tables in the density signal generation unit shown in FIG. 18 correspond to the tables shown in FIGS. 20(a), 20(b) and 20(c), respectively. In FIG. 18, the outputs of the color difference signal Vc/(Vr+Vc) and the luminance signal (Vr+Vc) generated in the extraction signal generation unit are simultaneously applied to the red, black and cyan tables, and the color signal output corresponding to the achromatic color, the red type color and the cyan type color is generated.

In FIGS. 20(b) and 20(c), the color signal output that exists in both zones of the ROM tables represents that the color zones overlap with one another. For example, a color such as violet (reddish violet to bluish violet) which is in between red and cyan is expressed by the mixed color of red and cyan in accordance with its tone. When brown is required, it is reproduced by use of black and red.

In the case of FIG. 18, the color signal is outputted also as the luminance signal. The document image read by CCD's provides the color signal and the luminance signal for each pixel.

The color designation means/color select generates select signals from blue, black, and red designation signals (hereinafter called "B.B.R. signals") that are determined by the designation signals generated from a control unit of the main body of the reproducing machine, not shown, and the signals from a switch of an operation panel of the reproducing machine which is not shown in the drawing, either, in order to designate and select the red buffer, the cyan buffer and the black buffer. When, for example, the blue developing device corresponding to the red type signal is operating, the signals of the cyan buffer and the black buffer are inhibited, the output signal is sent to the write unit B to let the laser diode emit the light, and the image of the red component of the document thus read is reproduced. Write-exposure is made for each color in accordance with each of the operating developing devices in accordance with the B.B.R. signal inputted as the color designation signal.

Figure 22:
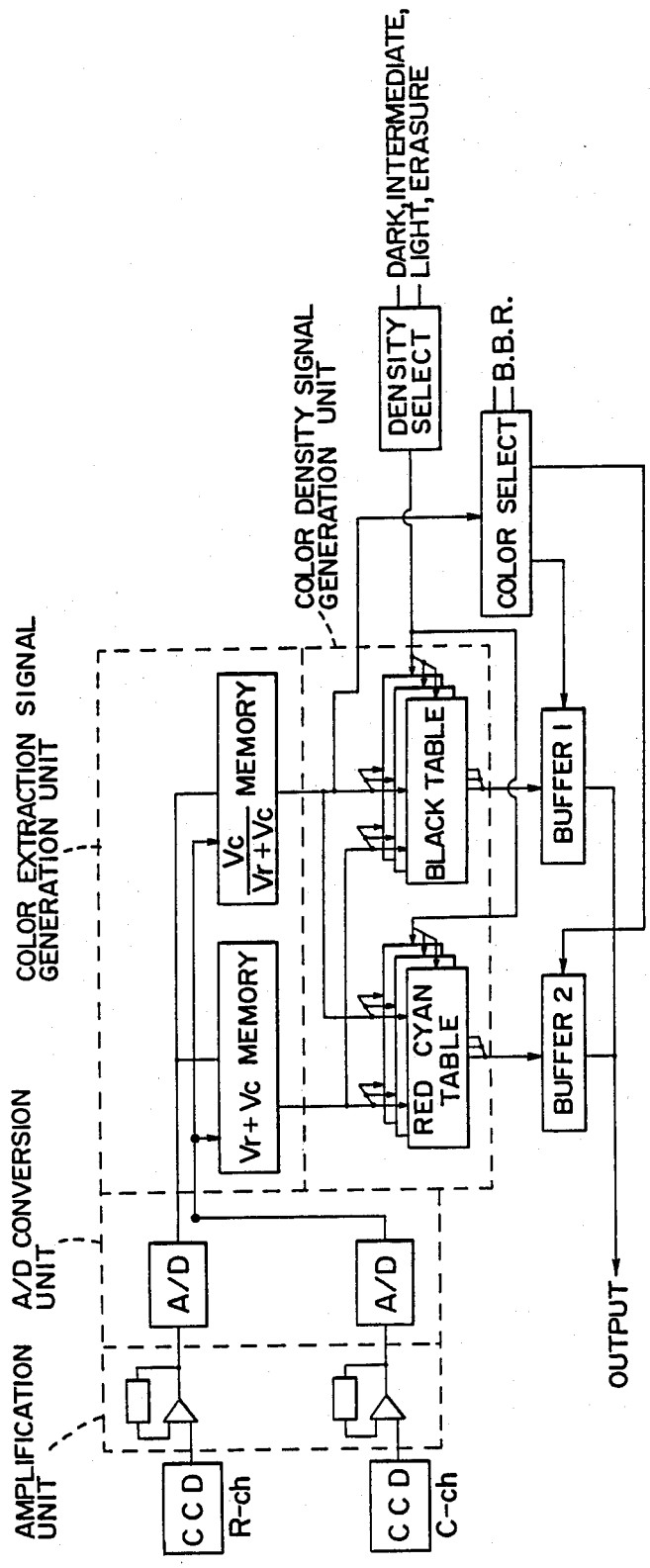

FIGS. 21(a), 21(b) and 22 are explanatory views of the color extraction recording signal generation unit in the apparatus of the present invention. This color extraction recording signal generation unit is constituted in such a manner that the colors cannot be recorded superposedly. Accordingly, this unit involves the limitation that it cannot reproduce violet or brown, for example, but makes it possible to use only one chromatic table (cyan and red table) without the necessity of preparing separately the two red and cyan tables of ROM tables.

According to the construction shown in FIG. 21(a), the density of the resulting recorded print can be designated to the four stages of colorless, light color, standard color and dark color. In this case, two-bit density output values corresponding to the four density stages described above but not 1-bit signal or "0" or "1" are written into the red table, the cyan table and the black table to which access is made by the color difference signal Vc/(Vr+Vc) and the luminance information signal (Vr+Vc). Therefore, two-bit buffers are used for the buffers 1, 2 and 3, respectively. According to the construction shown in FIG. 21(a), it becomes possible to either print in color the portion of the document which is colored by the marker pen or erase the portion. The color difference-luminance information of the fluorescent marker pen are positioned in the zones between $L_1$-$L_2$ and $L_1'$-$L_2'$ in FIG. 21(b), and are erased at the time of reproduction by use of ordinary monochromatic reproducing machines.

In this embodiment, the color of the fluorescent marker can be erased by changing the threshold value for determining the white color from $L_1$ to $L_2$ (from $L_1'$ to $L_2'$) or can be color-recorded by changing the threshold value from $L_2$ to $L_1$ (from $L_2'$ to $L_1'$). This is accomplished by comparing the four signals outputted from the buffers 1, 2, 3 with the threshold value 7 provided as the density determination signal, and recording for each color is made by use of the resulting output signal.

The circuit shown in FIG. 21(a) can be constituted in a manner as shown in FIG. 22. In the drawing, the chromatic color tables, that is, the red table and the cyan table, have a plurality of ROM tables so as to differentiate the output levels in accordance with the intended objects, respectively. A density selector is set by a push button of an operation portion of the main body of the reproducing machine, not shown, and the four stages of "dark", "normal", "light" and "color elimination" are designated. When any one of these stages is designated, the table having a threshold level which is in agreement with the intended object is selected from each ROM table so that a specific light color is stressed or eliminated.

The image formation conditions in the image formation apparatus of this embodiment are as follows. Image formation condition (1):
Image forming member:
  photosensitive layer: OPC
  drum diameter: 140 mm
  linear speed: 58 mm/sec
Surface potential:
  charge potential: −650 V (potential of non-image area at the time of development) potential of exposure portion: −10 V
Image exposure condition:
  light source: semiconductor laser
  wavelength: 780±20 nm
  recording density: 16 dots/mm
Developing device:
  sleeve: non-magnetic stainless, 18 mm in diameter, rotating at linear speed of 20 mm/sec
  magnet: 8 poles, rotating at 600 rpm
  flux density: 700 Gauss (sleeve surface)
Developer:
  carrier: magnetic powder resin dispersion system, average particle size (weight basis) 20 μm, specific resistance $10^{14}$ Ohm.cm or above, magnetization approx 50 emu/g $\sigma_{1000}$), $\sigma_{1000}$=magnetization in flux density of 1,000 Gauss
  toner:
    red (R): average particle size (weight basis) 11 μm, average charge quantity 10 μ c/g, (toner concentration 15 wt %)
    blue (B): average particle size (weight basis) 11 μm, average charge quantity 11 μ c/g, (toner concentration 15 wt %)
    black (K): average particle size (weight basis) 11 μm, average charge quantity 12 μ c/g, (toner concentration 15 wt %)
Developing condition:
  space between photosensitive member and sleeve, 1.0 mm
  thickness of layer of developer (when charged; restricted by non-magnetic blade; common to all colors): 0.2~0.88 mm
Developing bias:
  A(R) DC-500V, AC 1.0 kV (effective value) 2 kHz
  B(R) DC-500V, AC 1.0 kV (effective value) 2 kHz
  C(K) DC-500V, AC 0.8 kV (effective value) 2 kHz
Developing sequence: R→B→K
Other process conditions:
  transfer: corona transfer
  fixing: pressing by heat rollers
  cleaning: blade plus cleaning rollers
Photosensitive member used: Photosensitive members include selenium type, organic compound type, amorphous silicon type, titanium oxide type, zinc oxide type, and the like. However, the organic compound type is excellent because various compounds having various performances exist and the range of selection is extremely wide.

When the organic compound type is used, the photosensitive member is often formed by the combination of a charge generation substance and a charge transfer substance, and examples of these substances are as follows.

[Charge generation substance]

azo type: e.g., Japanese Patent Laid-Open Nos. 84943/1980 and 117151/1980 perylene type: e.g. Japanese Patent Laid-Open No. 36849/1980 anthraquione type: Japanese Patent Laid-Open No. 48334/1974 polycyclic quinone type: e.g. U.S. Pat. No. 3,992,205 indigoid type: e.g. Japanese Patent Laid-Open No. 30331/1972 phthalocyanine type: e.g Japanese Patent Laid-Open No. 59468/1980 quinacridone type: e.g. Japanese Patent Laid-Open No. 30332/1972 cyanine type: e.g. Japanese Patent Laid-Open Nos. 41230/1978 and 35734/1979

[Charge transfer substance]

arylalkane type: e.g. Japanese Patent Laid-Open Nos. 4153/1975 and 60927/1979 pyrazoline type: e.g. Japanese Patent Laid-Open No. 72231/1977 oxadiazole type: e.g. Japanese Patent Laid-Open No. 81151-1975 hydrazone type: e.g. Japanese Patent Laid-Open Nos. 81847/1979 and 74547/1980 styryl type: e.g. Japanese Patent Laid-Open Nos. 35319/1980 and 64243/1980 cyanine color type base: e.g. Japanese Patent Laid-Open No. 59468/1980 triphenylamine type: e.g. U.S. Pat. No. 3,658,520 phenylenediamine type: e.g. Japanese Patent Laid-Open No. 83435/1979 biphenylamine type: e.g. Japanese Patent Publication No. 11546/1964 and Japanese Patent Laid-Open No. 79450/1980 carbazole type: e.g. U.S. Pat. No. 4,209,327

[Preferred combinations with organic compound type photosensitive substance]

The charge generation substance must have sensitivity to semiconductor laser light and sufficient color sensitivity to red to infrared colors. Particular examples include azo type pigments disclosed in Japanese Patent Laid-Open No. 218447/1984 and phthalocyanine type compounds or complexes disclosed in Japanese Patent Laid-Open Nos. 219752/1984, 214034/1984, 155851/1984, 155847/1984, 59468/1980 and 147839/1979.

Preferred examples of the charge transfer substance include triarylamine derivatives disclosed in Japanese Patent Application No. 135890/1984, for example.

Practical preparation of photosensitive member:

Production or lamination technique as disclosed in Japanese Patent Laid-Open Nos. 135736/1977, 44028/1978, 76036/1978 and 58240/1978 may be used.

Developer used in the present invention:

Developers used in such an apparatus include two-component developers consisting of a toner and a carrier and one-component developers consisting of the toner alone. Though the ratio of the toner to the carrier must be controlled, the two-component developer has an advantage in that frictional charge of the toner particles can be controlled easily. Particularly in the case of the two-component developers consisting of a magnetic carrier and a non-magnetic toner, a large quantity of black magnetic substance need not be contained in the toner particles so that the color toner free from color turbidity due to the magnetic substance can be used and a clear color image can be formed.

Particularly preferably, the two-component developer used in the present invention consists of the magnetic carrier and the non-magnetic toner in the following manner.

Carrier:

There are many cases where a magnetic material is used as such, the surface of the magnetic material is coated with a resin or the like, and the magnetic powder in the fine powder form is mixed with a resin. The magnetic materials are those which are magnetized extremely strongly by a magnetic field in its direction, and examples of such materials include metals such as iron, cobalt and nickel, alloys and compounds containing ferromagnetic elements of iron, cobalt and nickel, such as ferrite, magnetite and hematite, alloys which do not contain ferromagnetic materials but exhibit strong ferromagnetism upon suitable heating, such as Ma- and Cu-containing Heusler's alloys typified by manganese-copper-aluminum and manganese-copper-tin alloys, and chromium dioxide. When these materials are used as such, their particle size is from about 5 $\mu$m to about 200 $\mu$m and it is the same when the surface is coated with a resin or the like. When they are used in the form of fine powder, however, 3 $\mu$m.

As the carrier constituent materials, toner constituent materials which will be described below are used fundamentally. In order to improve reproduction of delicate dots and lines or the tone wedge, the carrier particles are those which consist of the magnetic particles and the resin, such as a resin dispersion system of the magnetic powder and the resin and the magnetic particles coated by the resin. More preferably, the carrier particles are spherical and have a weight-average particle diameter of below 80 $\mu$m and most preferably, below 40 $\mu$m and above 5 $\mu$m. The resistivity of the carrier is at least $10^8$ Ohm.cm, more preferably at least $10^{13}$ Ohm.cm and most preferably, at least $10^{14}$ Ohm.cm in order to prevent deposition of the carrier on the image retainer surface when the charge is injected into the carrier by the bias voltage and to prevent extinguishement of the charge that forms the latent image due to the leakage of the bias voltage.

The resistivity of the toner and the carrier can be determined by placing the particles in a vessel having a sectional area of 0.5 $cm^2$, tapping the particles, applying a load of 1 $kg/cm^3$ to the particles, applying a voltage between the load and a bottom electrode to generate a filed of $10^2$ to $10^5$ V/cm, reading a current flowing thereby and making necessary calculation. In this case, the carrier particle layer is about 1 mm thick. Preferably, the carrier particles thus pulverized finely are formed into spheres by coating the surface of the magnetic substance with a thermoplastic resin described with reference to the toner or preparing particles from a resin containing fine magnetic particles dispersed therein in order to improve the fluidity of the developer, to also improve the charge controllability of the toner and to prevent mutual aggregation of the toner particles or aggregation between the toner particles and the carrier. These spherical carrier particles can be produced by selecting those magnetic particles which are as spherical as possible and then applying resin coating treatment to the particles in the case of the resin-coated carrier particles, and by selecting magnetic particles which are as fine as possible and forming them into spheres by hot air or hot water after the formation of dispersion resin particles or by directly forming spherical dispersion resin particles by spray drying, in the case of the carrier of the magnetic fine particle dispersion system.

Toner:

The toner used in the present invention is produced in accordance with heretofore known production methods of toners. For instance, the toner is produced by mixing preparatively a binder resin, a fluidity improving agent and other additives which are added whenever necessary, by use of a ball mill or the like, dispersing them uniformly, kneading the mixture in a heating roll, then cooling and pulverlizing the kneaded matter and classifying the resulting particles, whenever necessary.

A granulation polymerisation method can be used, too, as the toner production method. When a toner having a particle diameter of as small as from 1 to 10 $\mu$m is produced by the granulation polymerization method, there is obtained a spherical toner which can be used in the present invention.

Various thermoplastic resins can be used as the binder resin in the present invention. Examples of such resins include addition polymerisation type resins such as a styrene resin, a styrene-acrlyic resin, a styrene-butadiene resin, an acrylic resin, and the like, condensation polymerisation type resins such as a polyester resin, a polyamide resin, and the like, and an epoxy resin.

Among these resins, examples of the monomers for forming the addition polymerisation type resins include styrenes such as styrene, o-methyl-styrene, m-methylstyrene, p-methylstyrene, 3,4-dichlorostyrene, and the like; ethyelen tyep unsaturated monoolefins such as ethylene, propylene, butylene, isobutylene, and the like; vinyl halides such as vinyl chloride, vinylidene chloride, vinyl bromide, vinyl fluoride, and the like; vinyl esters such as vinyl acetate, vinyl propionate, vinyl benzoate, vinyl lactate, and the like; $\alpha$-methylene aliphatic acid monocarboxylates such as methyl acrylate, ethyl acrylate, n-butyl acrylate, isobutyl acrylate, propyl acrylate, n-octyl acrylate, dodecyl acrylate, lauryl acrylate, 2-ethylhexyl acrylate, n-octyl methacrylate, dodecyl methacrylate, lauryl methacrylate, 2-ethylhexyl methacrylate, stearyl methacrylate, phenyl methacrylate, dimethylaminoethyl methacrylate, diethylaminoethyl methacrylate, and the like; acrylic and methacrylic acid derivatives such as acrylonitrile, methacrylonitrile, acrylamide, and the like; vinyl ethers such as vinyl methyl ether, vinyl ethyl ether, vinyl isobutyl ether, and the like; vinyl ketones such as vinyl methyl ketone, vinyl hexyl ketone, methyl isopropenyl ketone, and the like; N-vinyl compounds such as N-vinylpyrrole, N-vinylcarbazole, N-vinylindole, N-vinylpyrrolidone, and the like; monoolefinic monomers such as vinylnaphthalenes; and diolefinic monomers such as propadiene, butadiene, isoprene, chloroprene, pentadiene, hexadiene, and the like. These monomers can be used either alone or in mixture.

Examples of monomers for forming the condensation type resins include ethylene glycol, triethylene glycol, 1,3-propylene glycol, and the like.

Preferred developer:

The carrier to be used in the present invention has preferably an average particle diameter of from about 5 to about 80 μm and most preferably, from 5 to 40 μm. The toner particle size is preferably from about 1 to about 20 μm, and most preferably from 3 to 15 pm. These developers are disclosed in the prior art references such as Japanese Patent Laid-Open No. 8360/1978, Japanese Patent Application Nos. 129213/1984, 107452/1984, 134078/1984, 125283/1984, 129215/1984, 129216/1984 and 129217/1984.

Toners:

(1) Thermoplastic resin: binder agent 80 to 90 wt %

Examples of the resins include polystyrene, styrene-acrylic polymers, polyester, polyvinyl butyral, epoxy resin, polyamide resin, polyethylene, ethylene-vinyl acetate copolymer, and the like, and their mixtures.

(2) Pigments: colorant 0 to 15 wt %

Examples of the pigments are as follows.

black: carbon black cyan: copper phthalocyanine, sulfonamide derivative dyes yellow: benzidine derivatives magenta: Rhodamine B Lake, Carmine 6B (3) Charge controller: 0 to 5 wt % plus toner: Nigrosine type electron-donating dyes and other dyes such as alkoxylated amines, akalyamide chelate, pigments, quaternary ammonium salts.

minus toner: electron-accepting organic complexes, chlorinated paraffine, chlorinated polyester, polyesters having excessive acid radicals, chlorinated copper phthalocyanine.

Fluidizing agent:

Examples are as follows. colloidal silica, hygroscopic silica, silicone varnish, metallic soap, anionic surface active agent.

(5) Cleaning agent (to prevent filming of toner on photosensitive member):

Examples are as follows. metal salts of aliphatic acids, oxidized silicic acid having organic radicals on the surface, fluorine-containing surface active agents.

(6) Filler (to improve surface luster of the image and to reduce the amounts of starting materials)

Examples are as follows. calcium carbonate, clay, talc, pigments.

Besides the materials described above, a magnetic material may be mixed in order to prevent fog and scattering of toner.

Examples of the magnetic powder include triiron tetraoxide, γ-ferric oxide, chromium dioxide, nickel ferrite, iron alloy powder and the like. The powder has a particle diameter of 0.1 to 1 μm and is contained in the toner in an amount of from 5 to 70 wt %.

The resistance of the toner varies to some extents depending upon the kind and amount of magnetic powder, and the amount of magnetic powder is preferably below 55 wt % in order to obtain sufficient resistance of at least $10^{18}$ Ohm.cm and preferably at least $10^{12}$ Ohm.cm. In order to secure clear colors as the color toner, the amount of the magnetic powder is preferably below 30 wt % and most preferably, below 5%.

Examples of the resins which undergo plastic deformation by force of about 20 kg/cm and adhere to paper includes wax, polyolefins, ethylene-vinyl acetate copolyerms, polyurethane, rubber and other bonding resins. An encapsulated toner can also be used.

The toner can be produced by use of the materials described above in accordance with the known production methods.

To obtain a more preferred image in the construction of the present invention, the particle diameter of the toner (weight-average particle diameter) is preferably below about 50 μm. Though there is no theoretical limitation as to the toner particle diameter in the present invention, it is generally from 1 to 30 μm and most preferably, from 3 to 15 μm, from the aspects of resolution, toner scattering and transfer. The weight-average particle diameter is measured with a Coulter Counter manufactured by Coulter Electronics, Inc Besides the production methods of the toner described above, a granulation polymerization method can also be used. A toner having a small particle diameter (10 μm and particularly from 1 to 5 μm) can be produced sufficiently by milling, but the toner obtained by the granulation polymerisation is believed to be more preferable.

FIG. 24(a) shows a construction of the second multi-color image forming apparatus of the present invention, and the multicolor image is formed by this apparatus in the following manner.

A document 218 placed on a document glass plate is irradiated with light from an illumination light source 213 that moves in an X direction, and its reflected light is coupled to a CCD camera element 217 through a mirror 214, a lens 215 and a color separation filter 216. The CCD camera element 217 converts the optical information into time series electric signals and sends them to an image data processing unit TR. (The above constitutes a read unit LE).

The image data processing unit TR forms recorded image data in accordance with procedures that are programmed in advance. The image data processing unit TR has a construction as shown in FIG. 25. A laser optical system 210 emits laser light on the basis of the recorded image data. On the other hand, an image retainer 201 is charged uniformly on its surface by a Scorotron charge electrode 202. Next, image exposure from the laser optical system 210 is applied to the image retainer 201 as shown in FIGS. 24(b), thereby forming an electrostatic latent image.

The electrostatic latent image is developed in a developing device A storing therein a yellow toner. After the toner image is formed, the image retainer 201 is charged again uniformly by the Scorotoron charging electrode 202 to receive the image exposure L. The resulting electrostatic latent image is developed in a developing device B storing therein a magenta toner. As a result, the two-color toner image by the yellow toner and the magenta toner is formed on the image retainer. Thereafter, a cyan toner image and a black toner image are formed superposedly on the image retainer 201. The resulting four-color toner image receives the charge by a pre-transfer charging electrode 209 and is transferred to recording paper P by a transfer electrode 204. The recording paper P is separated from the image retainer 201 by a separation electrode 205 and is then fixed by a fixing device 206. On the other hand, the image retainer 201 is cleaned by a charge eliminating electrode 207 and a cleaning device 208.

The cleaning device 208 includes a cleaning blade 281 and a fur brush 282. They are kept out of contact from the image retainer 201 during the image formation process, and when the multicolor image is formed on the image retainer 201, they come into contact with the image retainer 201 and scrape off any residual toner. Thereafter, the cleaning blade 281 comes off from the image retainer 201 and a little bit after, the fur brush 282 also comes off from the image retainer 201. The fur brush 282 eliminates any residual toner on the image retainer 201 when the cleaning blade 281 leaves the image retainer 201.

In the multicolor image forming apparatus, the image is developed at a rate of one color per rotation of the image retainer 201, but each image exposure must be started from the same position of the image retainer 201. Each electrode, the paper feed and transfer means and the cleaning device 208 other than the developing device and the charging electrode 202, which are not used during the image formation process, do not operate with respect to the image retainer 201.

The laser optical system 210 used for exposure is shown in FIG. 24(b). In the drawing, reference numeral 212 represents a semiconductor laser oscillator, 235 is a rotary polygonal mirror and 236 is an f-$\theta$ lens.

Figure 26:
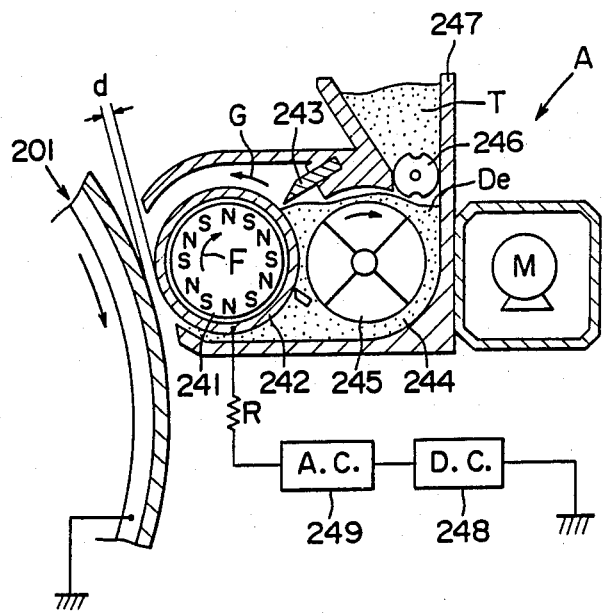

In the multicolor image forming apparatus shown in FIG. 24(a), four kinds of developing devices are used, and they may have the same or similar construction. Therefore, the sectional view of the first developing device A is shown as a representative in FIG. 26. The developer De is transferred in a direction represented by an arrow G while the magnetic roller 241 having 6 each N and S poles rotates in a direction represented by an arrow F and the sleeve 242 rotates in the direction G. The thickness of the developer De is restricted by a cluster limiting blade 243 to form a developer layer. A stirring screw 245 is disposed inside a developer reservoir 244 in order to sufficiently stir the developer, and when the developer De inside the developer reservoir 244 is consumed, a toner feed roller 246 rotates and supplies the toner T from a toner hopper 247.

The gap between the sleeve 242 and the image retainer 201 is kept so that the developer layer on the sleeve does not come into contact with the image retainer, and a D.C. power source 248 and an A.C. power source 249 are connected in series to the sleeve in order to apply a developing bias and to effect inversion development. Symbol R represents a protective resistor.

The developer and the photosensitive member used in this embodiment are the same as those used in the first embodiment, and the image formation conditions are as follows.

Image formation condition (2):
Image retainer:
  photosensitive layer: a-Se type
  drum diameter: 160 mm
  linear speed: 200 mm/sec
Surface potential:
  charge potential (potentian in unexposed portion at the time of developement): 800 V
  potential of photosensitive portion: 0 V
Exposure condition:
  light source: semiconductor laser
  wavelength: 780±20 nm
  recording density: 16 dots/mm
Developing device:
  sleeve: nonmagnetic stainless steel, 20 mm in diameter, rotating at linear speed of 200 mm/sec
  magnet: 12-pole, rotating at 500 rpm
  flux density: 800 Gauss (sleeve surface)
Developer:
  carrier: magnetic powder resin dispersion system, average particle diameter (weight basis) 20 $\mu$m, resistivity $10^{14}$ ohm.cm or above, magnetisation approx 50 emu/g ($\sigma_{1000}$), $\sigma_{1000}$=magnetisation in flux density of 1000 Gauss
  toner:
    yellow (Y): average particle diameter (weight basis) 9 $\mu$m, average charge quantity 8 $\mu$c/g (toner concentration 15 wt %)
    magenta (M): average particle diameter (weight basis) 9 $\mu$m, average charge quantity 9 $\mu$c/g (toner concentration 15 wt %)
    cyan (C): average particle diameter (weight basis) 9 $\mu$m, average charge quantity 9 $\mu$c/g (toner concentration 15 wt %)
    black (K): average particle diameter (weight basis) 9 $\mu$m, average charge quantity 10 $\mu$c/g (toner concentration 15 wt %)
Developing condition:
  gap between photosensitive member and sleeve: 1.0 mm
  thickness of developer layer (when stationary, restricted by nonmagnetic blade; common to all colors): 0.2 to 0.6 mm
  developing bias:
    A (Y) DC 600 V, AC 1.2 kV (effective value) 2 kHz
    B (M) DC 600 V, AC 1.2 kV (effective value) 2 kHz
    C (C) DC 600 V, AC 1.0 kV (effective value) 2 kHz
    D (K) DC 600 V, AC 0.8 kV (effective value) 2 kHz
  developing sequence: Y→M→C→K
Other process conditions
  transfer: corona transfer
  fixing: heating by heat rollers
  cleaning: blade and fur brush.

Next, the developing method will be described.

Though not particularly limitative, the developing method of the present invention is preferably a non-contact developing system in which the developer layer on the sleeve does not come into sliding contact with the surface of the image retainer in order to prevent the damage of the toner image at least in the second development and so on. This non-contact system generates an A.C. field in the developing zone and effects development without bringing the image retainer into contact with the developer layer. Hereinafter, this non-contact system will be described in detail.

Repetition development using the A.C. field as described above allows repetition of development several times for the image retainer on which the toner image(s) have already been formed. Unless suitable development conditions are set, however, the problems will occur in that the toner image that has already been formed on the image retainer in the preceding stage(s) is disturbed by the subsequent development, and the toner that has already been deposited on the image retainer enters the developing device of the subsequent stage storing the developer having a different color from that of the developer of the preceding stage. To solve these problems, the non-contact system fundamentally conducts the operations without bringing the developer layer on the sleeve into contact or sliding contact with the image retainer. To accomplish this object, the gap between the image retainer and the sleeve, when no potential difference exists between them, is kept greater than the thickness of the developer layer in the developing zone on the sleeve. The present inventors clarified experimentally that in order to avoid more completely the problems described above and to form the toner image with a sufficient image density, there exists a preferred developing condition. It is difficult to obtain an extremely excellent image even when the gap d (mm) between the image retainer and the developer transfer member in the developing zone, which will be called simply the gap d, the amplitude $V_{ac}$ of the developing bias A.C. component and its frequency f (Hz) are determined individually, and these parameters are closely related with one another.

The experimental process will now be explained.

The experiments were carried out by use of the multi-color image forming device shown in FIG. 24(a) to examine the influences of the parameters such as the voltage and frequency of the A.C. component of the developing bias of the developing device B when the two-color toner image was formed by the developing devices A and B.

First of all, the developer De stored in the developing device B was a one-component magnetic developer, and was prepared by mixing, kneading and pulverizing 7.0 wt % of a thermoplastic resin, 10 wt % of a pigment (carbon black), 20 wt % of a magnetic material and a charge controller in an average particle diameter of 15 $\mu$m, and further adding a fluidizing agent such as silica. The charge quantity was controlled by the charge controller.

When the experiments were carried out while varying the conditions described above, the relation between the amplitude $E_{ac}$ of the A.C. field intensity (obtained by dividing the bias voltage $V_{ac}$, described below, by d) and the frequency could be determined with the result shown in FIG. 27.

Figure 27:
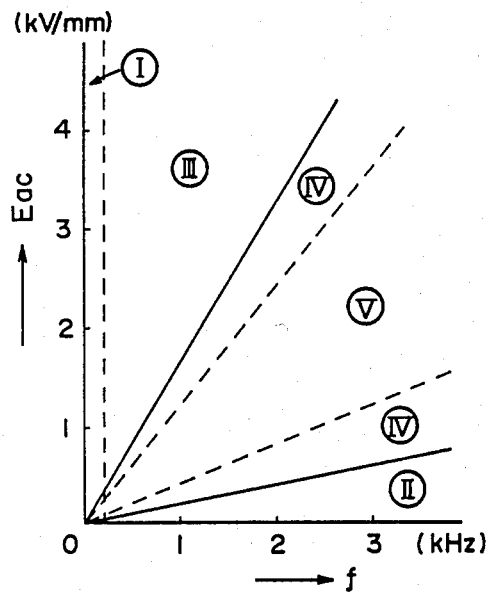

In FIG. 27, the zone represented by I is a region where non-uniformity of development is likely to occur, the zone II is a range where the effect of the A.C. component does not appear, III is a range where the toner image that has already been formed is likely to get broken, and IV and V are ranges where the effect of the A.C. component appears, a sufficient development density can be obtained and the breakage of the toner image does not occur. The zone V is a particularly preferred range.

The inventors of the present invention reached the conclusion through the experiments that when development is conducted under the condition that satisfies the following relation between the amplitude $V_{ac}$ (V) of the A.C. component of the developing bias, its frequency f (Hz) and the gap d (mm) between the image retainer 201 and the sleeve 207 in each development stage, subsequent development can be made in a suitable density without disturbing the toner image that has already been formed on the image retainer 201:

$$0.2 \leq V_{ac}/(d \cdot f) \leq 1.6$$

In order to obtain a sufficient image density and not to disturb the toner image that has been formed in the preceding stage(s), it is more preferred to satisfy the following condition:

$$0.4 \leq V_{ac}/(d \cdot f) \leq 1.2$$

Among the ranges that satisfy the relation described above, a range expressed by the following relation, which corresponds to an electric field a little lower than the field where the image density gets into saturation, is more preferred:

$$0.6 \leq V_{ac}/(d \cdot f) \leq 1.0$$

When the frequency f of the A.C. component is at least 200 Hz and a rotating magnetic roller is used as means for feeding the developer to the image retainer 201 in order to prevent the nonuniformity of development due to the A.C. component, the frequency of the A.C. component is preferably at least 500 Hz to eliminate humming due to the A.C. component and the rotation of the magnetic roller.

Figure 24:
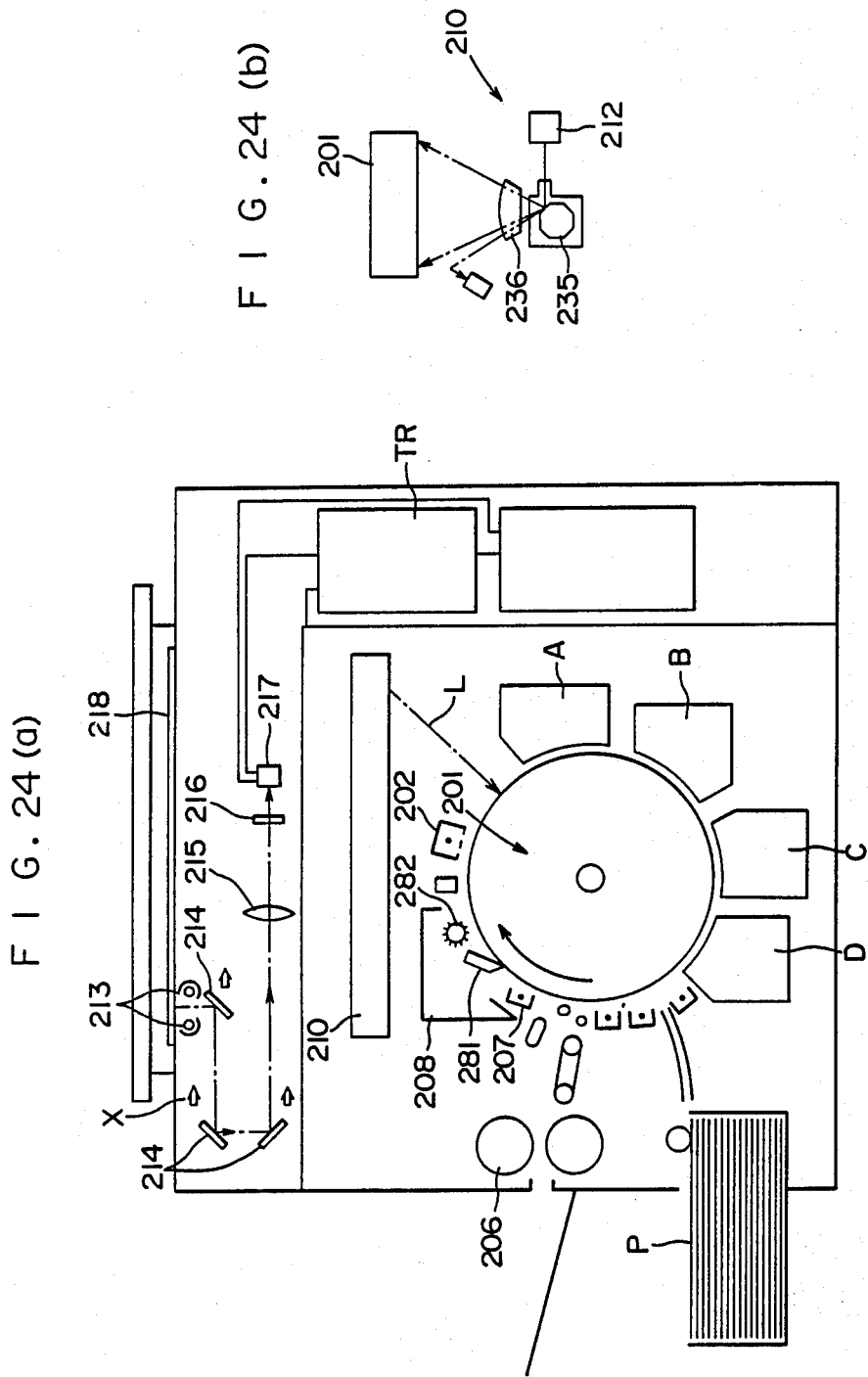
Figure 25:
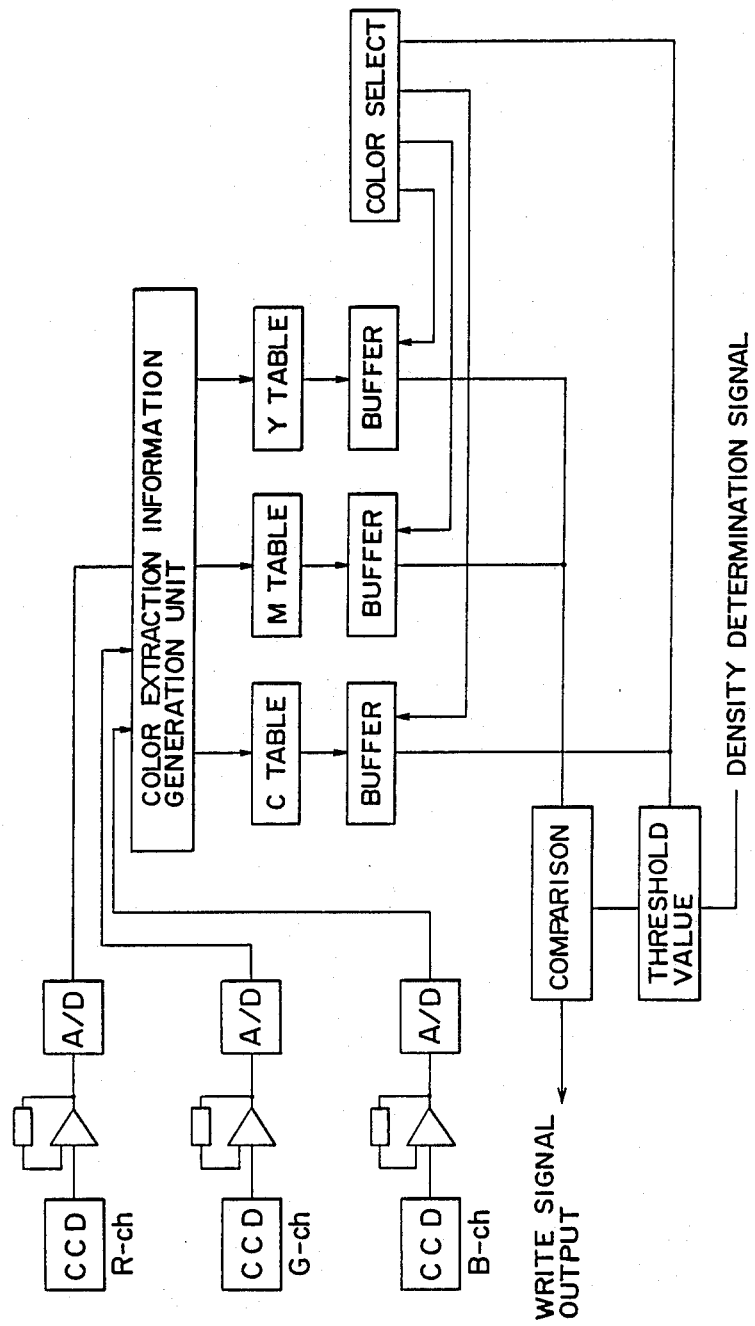

Next, experiments were carried out in the same way as described above by use of a two-component developer and the multicolor image forming apparatus shown in FIG. 24 (a). The developer De stored in the developing device B was a two-component developer consisting of a magnetic carrier and a non-magnetic toner, and the carrier was prepared by dispersing fine iron oxide powder in a resin so that its average particle diameter was about 20 $\mu$m, magnetization was 30 emu/g and resistivity was $10^{14}$ Ohm.cm. The toner was prepared by mixing, kneading and pulverising 90 wt % of a thermoplastic resin, 10 wt % of a pigment (carbon black) and a small amount of a charge controller in an average particle diameter of 10 $\mu$m. The developer De was prepared by mixing the carrier and toner at a ratio of 80 wt % of the former to 20 wt % of the toner. In this case, the toner was electrically charged negative due to friction with the carrier.

The developing device A stored therein a yellow two-component developer.

Figure 28:
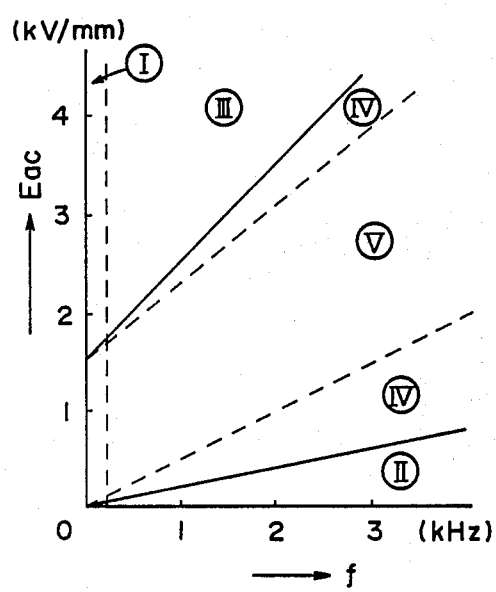
Figure 29:
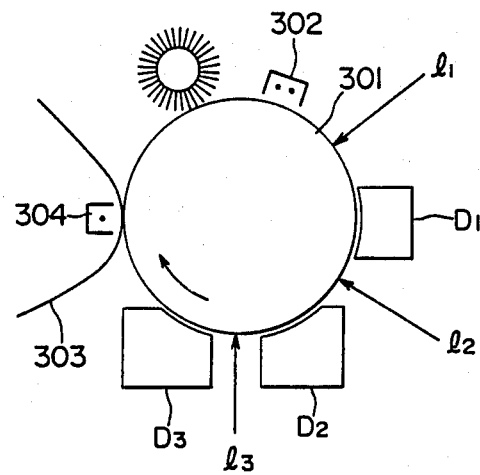
FIGS. 29 and 30 explanatory views of heretofore known image forming apparatuses.
Figure 30:
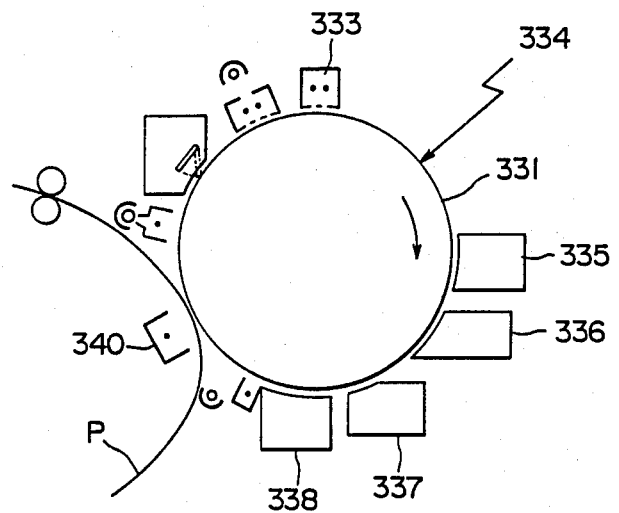

When the experiments were carried out in the same way as described above by varying the conditions, the relation between the amplitude $V_{ac}$ of the A.C. component and the frequency f could be determined with the result shown in FIG. 28.

In FIG. 28, symbol I represents a range where non-uniformity of development is likely to occur, II is a range where the effect of the A.C. component does not occur, III is a range where the toner image that has already been formed is likely to get broken, and IV and V are ranges where the effect of the A.C. component appears, a sufficient development density can be obtained and the toner image that has already been formed is not broken. Among them, V is a particularly preferred range.

The inventors of the present invention reached the conclusion through the experimental results described above that subsequent development can be effected in a suitable density without disturbing the toner image that has already been formed on the image retainer 201 when development is effected under the condition that satisfies the following relation in each development stage between the amplitude $V_{ac}$ of the A.C. component of the developing bias, its frequency f (Hz) and the gap d (mm) between the image retainer 201 and the sleeve 207:

$$0.2 \leq V_{ac}/(d \cdot f)[(V_{ac} \cdot d) - 1{,}500]/f \leq 1.0$$

In order to obtain a sufficient image density and not to disturb the toner image that has already been formed in a preceding stage, it is further preferred that the following condition be satisfied:

$$0.5 \leq V_{ac}/(d \cdot f)[(V_{ac} \cdot d) - 1{,}500]/f \leq 1.0$$

A multicolor image which is clearer and devoid of any turbidity can be obtained if the following relation is satisfied among the range described above:

$$0.5 \leq V_{ac}/(d \cdot f)[(V_{ac} \cdot d) - 1{,}500]/f \leq 0.8$$

and incorporation of the toner having a different color into the developing device can be avoided even when the device is operated repeatedly.

When the frequency of the A.C. component is at least 200 Hz and a rotating magnetic roller is used as means for feeding the developer to the image retainer 201 in the same way as when the one component developer is used in order to prevent nonuniformity of development due to the A.C. component, it has been clarified experimentally that the frequency of the A.C. component be at least 500 Hz in order to prevent humming due to the A.C. component and the rotation of the magnetic roller.

The image formation process of the present invention has thus been illustrated. In order to sequentially develop subsequent toner image(s) in a predetermined density on the image retainer without disturbing or destroying the toner image that has already been formed on the image retainer 201, the following methods are preferably employed either alone or in combination:

(1) Toners having sequentially increasing charge quantities are used.

(2) The amplitude of the A.C. component of the developing bias is sequentially decreased.

(3) The frequency of the A.C. component of the developing bias is sequentially increased.

In other words, the greater the charge quantity of the toner, the more susceptible the toner to the influence of the electric field. Therefore, if the toner particles having a large charge quantity are deposited to the image retainer 201 in an initial stage, the toner particles are likely to return to the sleeve in the stages of subsequent development. The item (1) described above serves to prevent the return of the toner particles to the sleeve in the stages of subsequent development by use of the toner particles having a small charge quantity in the initial stage. The item (2) serves to prevent the return of the toner particles that have already been deposited on the image retainer to the sleeve by sequentially reducing the field intensity. Particular examples of the methods of reducing the field intensity includes a method comprising lowering sequentially the voltage of the A.C. component and a method comprising increasing progressively the gap d between the image retainer 201 and the sleeve 207 in the subsequent development stages. The item (3) serves to prevent the return of the toner particles that have already been deposited on the image retainer 201 by progressively increasing the frequency of the A.C. component as development is repeated.

Though effective when used alone, these methods (1), (2) and (3) provide a greater effect when combined with one another such as a combination which sequentially increases the toner charge quantity in the course of repetition of development and sequentially reducing the A.C. bias. When these three methods are employed, a suitable image density or color balance can be maintained by adjusting the D.C. biases, respectively.

Next, still another embodiment of the present invention will be described.

Figure 23:
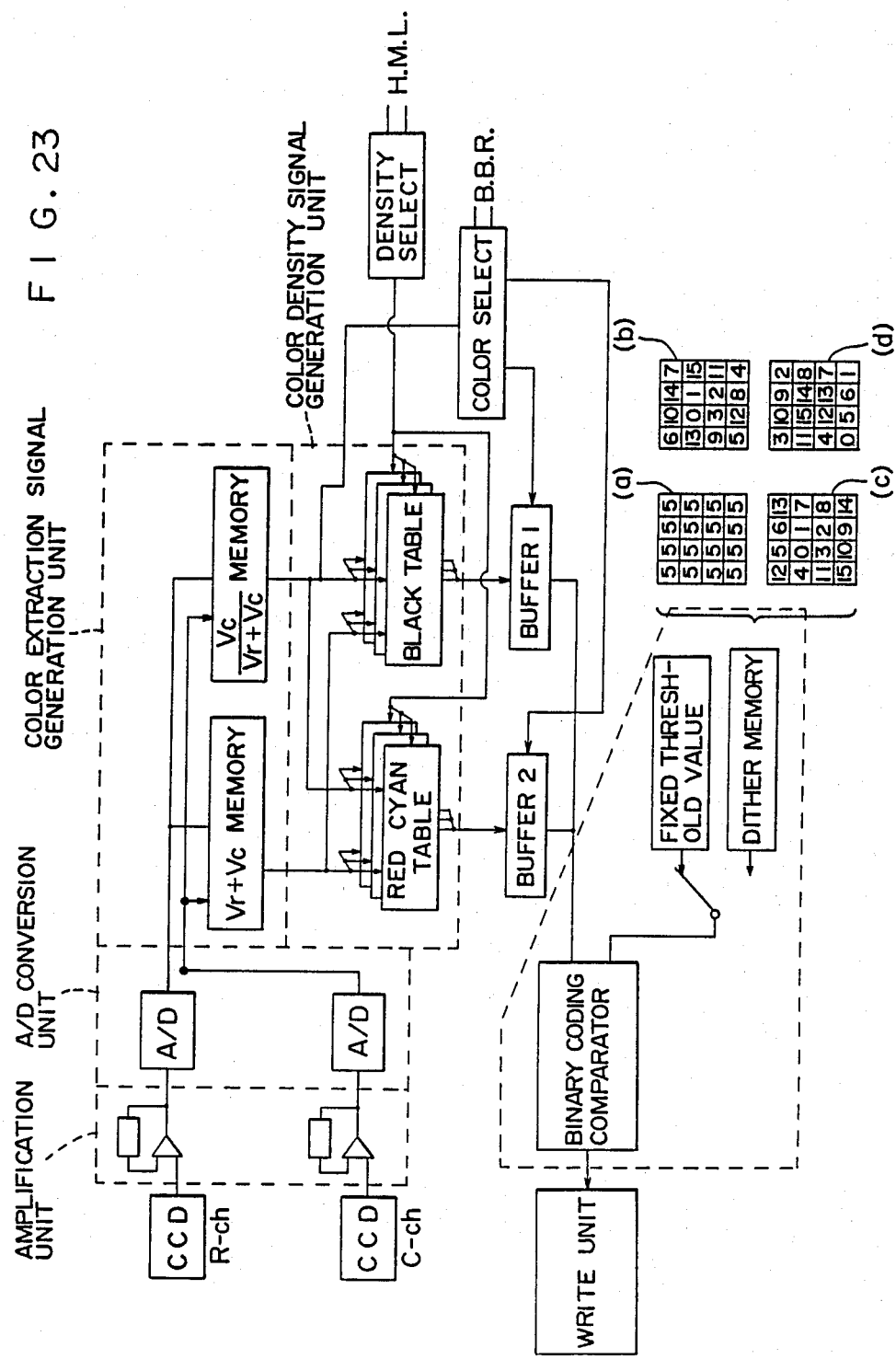

In this embodiment, the read signal processing unit E of the foregoing embodiment is replaced with the signal processing unit shown in FIG. 23.

In the signal processing unit E of this embodiment, a buffer 2 receives the output from a chromatic color (red, cyan) table and a buffer 1 receives the output from a black table, and 4-level signals as the outputs of these buffers 1, 2 are applied to a binary coding comparator to change over and select a fixed threshold value and dither memory storing dither matrix (a), (b), (c) and (d). Accordingly, recording can be made in the write unit B for writing and recording by binary-coded signals, and recording can be made reliably with a large range of changing and with reduced contamination and fog.

As described above, the image forming apparatus in accordance with the present invention separates reflected light from the document into at least two mutually different wavelength component optical images, converts them into electric signals, converts the electric signals into digital signals, extracts colors from the digital signals on the basis of predetermined color information and obtains color signal outputs. Therefore, write of the color image to the photosensitive member can be made easily by use of write means such as laser scanner, and the output of the judgement means, which determines that the signal outputted as the color signal is white in accordance with the reflected light quantity from the document, judges the white color portion as the non-image area in order to prohibit the deposition of the toner. Accordingly, a clear color copy can be obtained which is devoid of fog in the non-image area.

In accordance with the present invention, a plurality of reflected light quantity levels are provided for a document which is determined as the white color portion, so that portions lightly colored with the marker pen or the like can be reproduced or eliminated as desired, and an easy-to-view color copy can be obtained.

Since the means for determining the white color portion are separately provided for the chromatic colors and the achromatic colors in the apparatus of the present invention, there can be obtained a remarkable effect that a copy having a feeling of naturalness can be obtained from the document of the achromatic color. Accordingly, the image forming apparatus of the present invention can be used not only as a monochromatic reproducing machine providing high quality and having high resolution but also as a color reproducing machine which can provide automatically a color copy from a color document.

What is claimed is:

1. An image processing apparatus comprising:
    optical means for obtaining optical signals of two colors that are complementary to each other from document information;
    photo-electric conversion means for converting said optical signals from said optical means into electric signals, respectively;
    color extraction information generation means for processing two image signal outputs of said photo-electric conversion means and extracting colors on the basis of the result of processing; and
    color information storage means for storing color information designated by the color extraction information of said color extraction information generation means.

2. The image processing apparatus as defined in claim 1, wherein said color information storage means stores therein a density correspondence value.

3. The image processing apparatus as defined in claim 1, wherein said color information storage means consists of an achromatic color data storage range and at least one chromatic color data storage range.

4. The image processing apparatus as defined in claim 3, wherein colors belonging to the same range are outputted as a signal of the same color to said chromatic color data storage range.

5. The image processing apparatus as defined in claim 2, wherein said color extraction information generation means receives color extraction information from the sum of the outputs of said photoelectric conversion means and a value obtained by dividing the output of one of said photo-electric conversion means by the sum of the outputs of both of said photo-electric conversion means.

6. The image processing apparatus as claimed in claim 1 wherein said color extraction information generation means comprises a single circuit means for determining achromatic and chromatic color components.

7. The image processing apparatus as claimed in claim 1 wherein said color extraction information generation means comprises a circuit means for determining achromatic color components and an independent circuit means for determining chromatic color.

8. A color image forming apparatus comprising:
means for scanning a document;
means for irradiating said document with light and separating a reflected light from said document into optical images having at least two mutually different wavelength components;
means for converting said optical images into electric signals;
means for converting said electric signals into digital signals;
means for extracting colors from said digital signals on the basis of predetermined color information and outputting color signals;
means for converting said color signals into optical signals;
means for scanning a photosensitive member which is charged uniformly, and writing said optical signals on said photosensitive member; and
a plurality of development means for developing said photosensitive member, into which said optical signals are written, by developers;
wherein writing to said photosensitive member and development are effected several times and then the image is transferred to a member to which it is to be transferred.

9. The color image forming apparatus as defined in claim 8, which further includes means for determining said output color signals as a white color in accordance with the quantity of reflected light from said document, and said developers are not deposited to said white color portion to make a nonimage area in accordance with the output of said determination means.

10. The color image forming apparatus as defined in claim 9, wherein a plurality of levels are provided for the quantity of the reflected light from said document which is to be determined as said white color portion.

11. The color image forming apparatus as defined in claim 9, wherein said determination means for determining said white color portion is provided in accordance with the color of each of said developers.

12. The color image forming apparatus as defined in claim 9, wherein said determination means for determining said white color are disposed separately for chromatic colors and achromatic colors.

13. The color image forming apparatus as defined in claim 12, wherein a plurality of levels are provided for said chromatic colors and said achromatic colors.

14. The image forming apparatus as defined in claim 9, wherein said determination means for determining said white color portion are disposed separately for the three primary colors.

15. An image processing method comprising separating optical information into two separate complementary color components;
photoelectrically converting said two color components into two electrical signals;
forming multi-color image signals on the basis of said two electrical signals;
selecting one color component out of said multi-color image signals;
generating a reference signal corresponding to said selected color component;
comparing an image signal of said selected color component with said reference signal; and
forming a recording image signal on the basis of the result of the comparison.

16. The image processing method as defined in claim 15, wherein each of said image signals among said multi-color image signals comprises a plurality of bits.

17. An image processing apparatus comprising:
optical means for separating an inputted light into optical signals of two complementary colors;
photoelectric conversion means for converting each of said optical signals into two image signals;
image signal forming means for forming multi-color image signals on the basis of said two image signals;
selection means for selecting one color component among said multi-color image signals;
reference signal generation means for generating a reference signal corresponding to said selected color component;
comparison means for comparing an image signal of said selected color component with said reference signal; and
recording image forming means for forming a recording image based upon the output of said comparison means.

18. The image processing apparatus as claimed in claim 17 wherein said image signal forming means comprises storage means storing therein a reference table in which said two image signals are compared to said multi-color image signals.

19. The image processing apparatus as defined in claim 18, wherein said storage means stores therein a density correspondence value.

20. The image processing apparatus as defined in claim 18, wherein said storage means comprises an achromatic color data storage range and at least one chromatic color data storage range.

21. The image processing apparatus as defined in claim 20, wherein colors belonging to said chromatic color data storage range are recognized as the same color.

22. The image processing apparatus as defined in claim 17, wherein color components of said multi-color image signals formed by said image signal forming means include a chromatic and an achromatic color.

* * * * *